US011803347B2

(12) United States Patent
Tanaka et al.

(10) Patent No.: US 11,803,347 B2
(45) Date of Patent: Oct. 31, 2023

(54) IMAGE DISPLAY SYSTEM AND IMAGE DISPLAY METHOD

(71) Applicant: Panasonic Intellectual Property Management Co., Ltd., Osaka (JP)

(72) Inventors: Yoshito Tanaka, Kyoto (JP); Takashi Yamada, Osaka (JP); Daizaburo Matsuki, Osaka (JP); Yoshinori Okazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/466,572

(22) Filed: Sep. 3, 2021

(65) Prior Publication Data

US 2021/0397400 A1 Dec. 23, 2021

Related U.S. Application Data

(63) Continuation of application No. PCT/JP2020/007296, filed on Feb. 25, 2020.

(30) Foreign Application Priority Data

Mar. 4, 2019 (JP) .................................. 2019-038338

(51) Int. Cl.
*G06F 3/14* (2006.01)
*G09G 3/00* (2006.01)

(52) U.S. Cl.
CPC .......... *G06F 3/1446* (2013.01); *G09G 3/001* (2013.01); *G09G 2300/026* (2013.01);
(Continued)

(58) Field of Classification Search
CPC .................. G06F 3/1446; G09G 3/001; G09G 2300/026; G09G 2320/0261;
(Continued)

(56) References Cited

U.S. PATENT DOCUMENTS 10,004,984 B2 6/2018 Voris et al.
2002/0167531 A1* 11/2002 Baudisch .............. G06F 3/1446
345/611

(Continued)

FOREIGN PATENT DOCUMENTS

JP 2008-216427 9/2008
JP 2010-231931 10/2010
(Continued)

OTHER PUBLICATIONS

International Search Report dated Jun. 2, 2020 in corresponding International Application No. PCT/JP2020/007296.

*Primary Examiner* — Amare Mengistu
*Assistant Examiner* — Gloryvid Figueroa-Gibson
(74) *Attorney, Agent, or Firm* — Wenderoth, Lind & Ponack, L.L.P.

(57) ABSTRACT

An image display system causes a plurality of image display devices having different device characteristics to respectively display images. The image display system includes an external light detection device that detects external light and an image adjustment device that performs adjustment to make at least one of contrast, chromaticity, and luminance continuous between the images displayed on the plurality of image display devices, the adjustment being performed based on the device characteristics and the detected external light.

14 Claims, 22 Drawing Sheets

(52) U.S. Cl.
CPC .......... *G09G 2320/028* (2013.01); *G09G 2320/0261* (2013.01); *G09G 2320/066* (2013.01); *G09G 2320/0626* (2013.01); *G09G 2320/0666* (2013.01); *G09G 2360/144* (2013.01)

(58) Field of Classification Search
CPC ..... G09G 2320/028; G09G 2320/0626; G09G 2320/066; G09G 2320/0666; G09G 2360/144
USPC .......................................................... 345/589
See application file for complete search history.

(56) References Cited

U.S. PATENT DOCUMENTS

| | | | |
|---|---|---|---|
| 2005/0134525 A1* | 6/2005 | Tanghe | G06F 3/1446 345/1.1 |
| 2013/0147365 A1 | 6/2013 | Takahashi | |
| 2016/0180812 A1 | 6/2016 | Choi et al. | |
| 2016/0202758 A1* | 7/2016 | Peana | G06F 3/013 345/601 |
| 2018/0117465 A1 | 5/2018 | Voris et al. | |

FOREIGN PATENT DOCUMENTS

| | | |
|---|---|---|
| JP | 2013-140780 | 7/2013 |
| JP | 2013-238793 | 11/2013 |
| JP | 2016-126229 | 7/2016 |
| JP | 2017-181592 | 10/2017 |

\* cited by examiner

IMAGE DISPLAY SYSTEM AND IMAGE DISPLAY METHOD

BACKGROUND

1. Technical Field

The present disclosure relates to an image display system including a plurality of image display devices having different device characteristics and an image display method.

2. Description of the Related Art

PTL (Patent Literature) 1 discloses an interactive indoor show and a game system which are configured to provide an attractive and immersive multimedia show or presentation in a room. The system disclosed in PTL 1 includes a controller for selectively operating a display device, an image projector, an audio system (such as speakers), and other show components (a light source, fan, mechanical device, and the like).

PTL 1 is U.S. Pat. No. 10,004,984.

SUMMARY

The system in PTL 1 includes a display and a projector. However, these devices have different device characteristics from each other. In this case, the "device characteristics" refer to the display characteristics of a device including the relationship between the illuminance of external light and the contrast (dynamic range) of an image by the image display device and the influence of chromaticity of external light on the chromaticity of an image by the image display device. Accordingly, depending on conditions such as external light, the continuity of contrast or chromaticity is not maintained between the two display images displayed by a display and a projector, and the sense of immersion in the show or game may be impaired.

The present disclosure provides an image display system and an image display method that improve the continuity between images displayed by image display devices in an image display system including a plurality of image display devices having different device characteristics.

An image display system according to the first aspect of the present disclosure causes a plurality of image display devices having different device characteristics to respectively display images. The image display system includes an external light detection device that detects external light and an image adjustment device that performs adjustment to make at least one of contrast, chromaticity, and luminance between the images displayed on the plurality of image display devices, the adjustment being performed based on device characteristics and detected external light.

An image display system according to the second aspect of the present disclosure causes a plurality of image display devices to respectively display images. The image display system includes an image adjustment device that, in a case in which a predetermined original image is divided into a plurality of images and the plurality of divided images are respectively displayed on the plurality of image display devices, displays the plurality of divided images to form one continuous original image when viewed from a viewpoint position of a user.

Therefore, according to the image display system of the present disclosure, it is possible to improve the continuity between display images by a plurality of image display devices having different device characteristics.

DETAILED DESCRIPTION

Hereinafter, exemplary embodiments will be described in detail with appropriate reference to the drawings. However, an unnecessarily detailed description such as a detailed description of already well-known matters and an overlapping description of substantially the same configuration will be sometimes omitted. This is to avoid an unnecessarily redundant description below and to facilitate understanding of a person skilled in the art.

Note that the attached drawings and the following description are provided for those skilled in the art to help sufficient understanding of the present disclosure, and are not intended to limit the subject matter as described in the appended claims.

(First Exemplary Embodiment)

A first exemplary embodiment will be described below with reference to FIGS. 1 to 5D. The configuration of image display system 1 according to the first exemplary embodiment will be described first with reference to FIGS. 1 to 4.

[1-1. Configuration]

Figure 1:
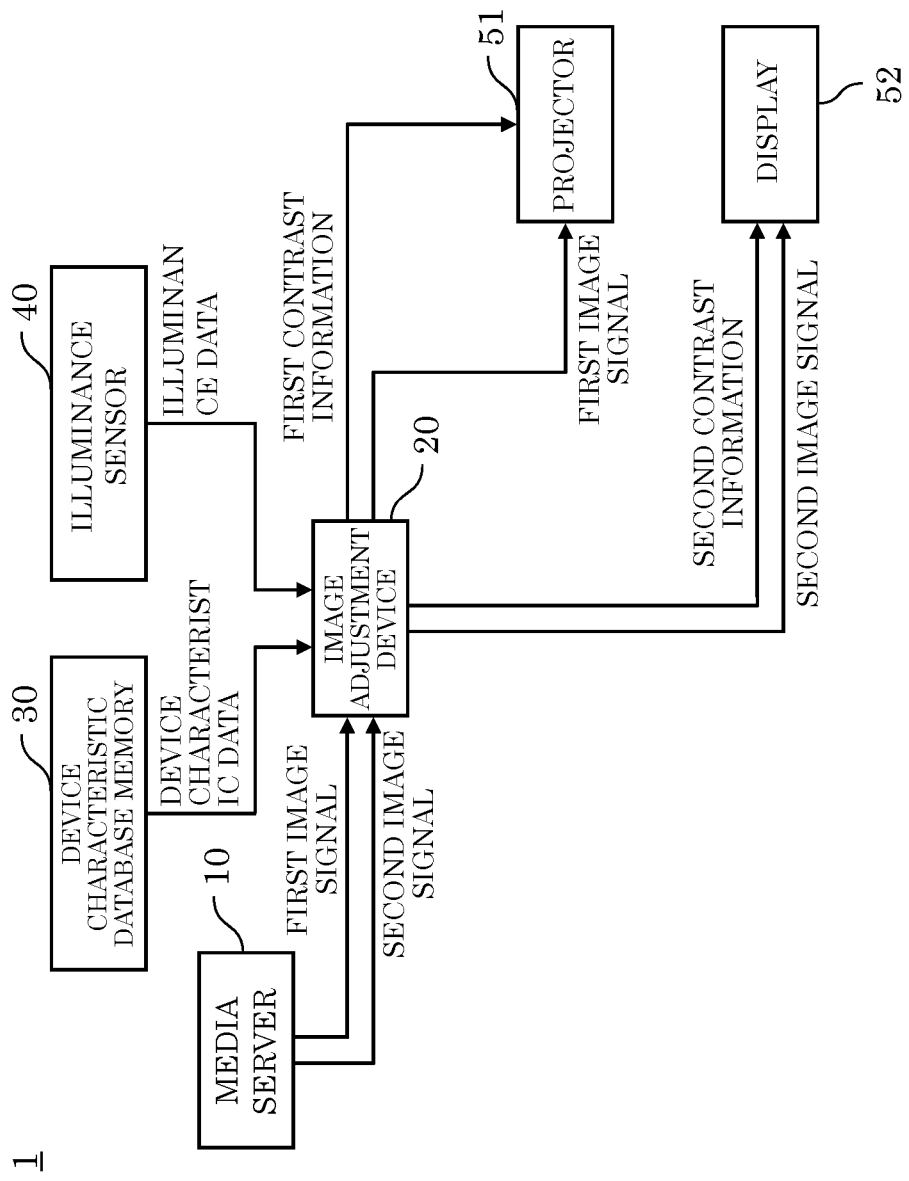
FIG. 1 is a block diagram illustrating a configuration example of image display system 1 according to a first exemplary embodiment.
Figure 2A:
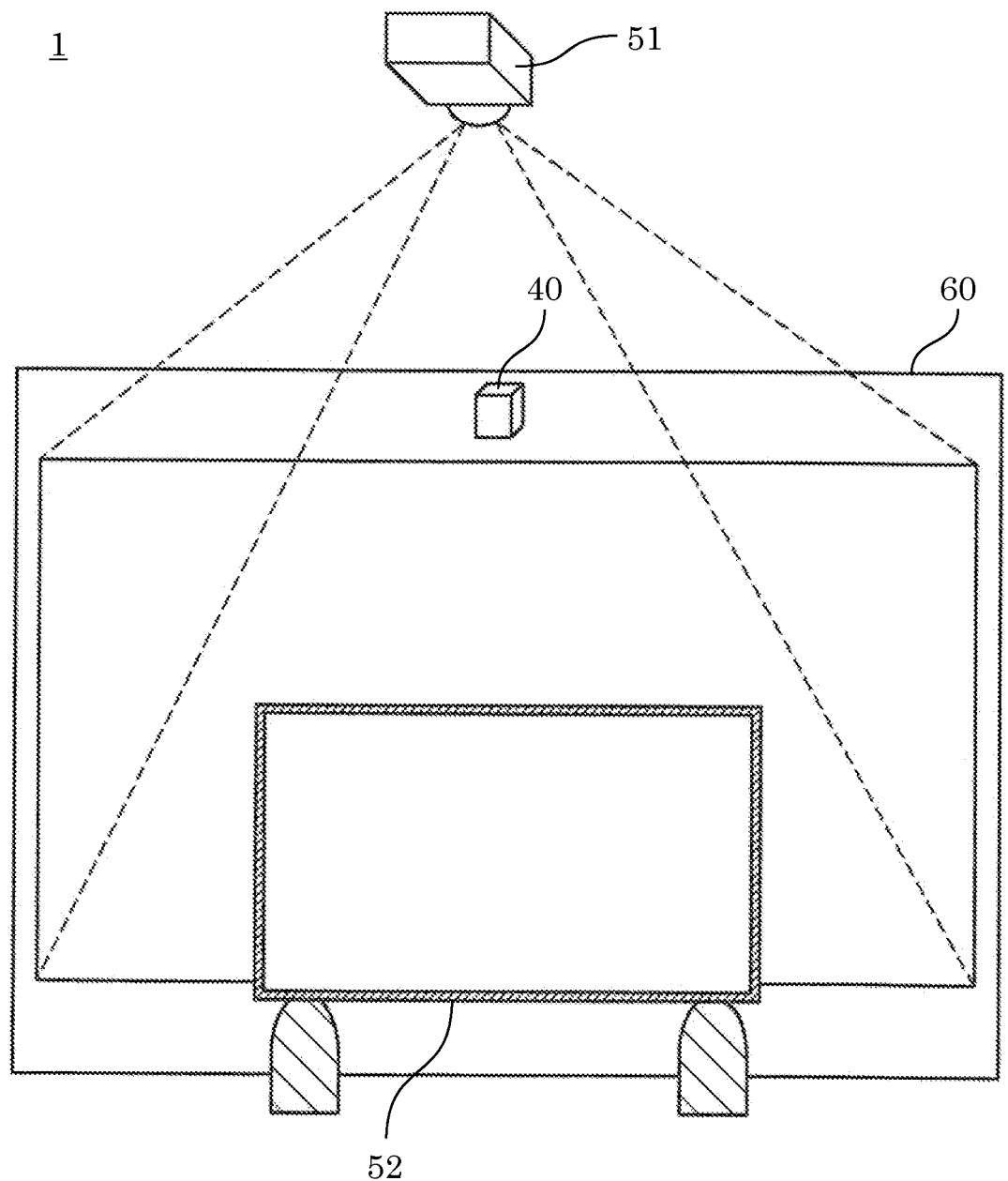
FIG. 2A is a front view illustrating an external appearance example of image display system 1 in FIG. 1.
Figure 2B:
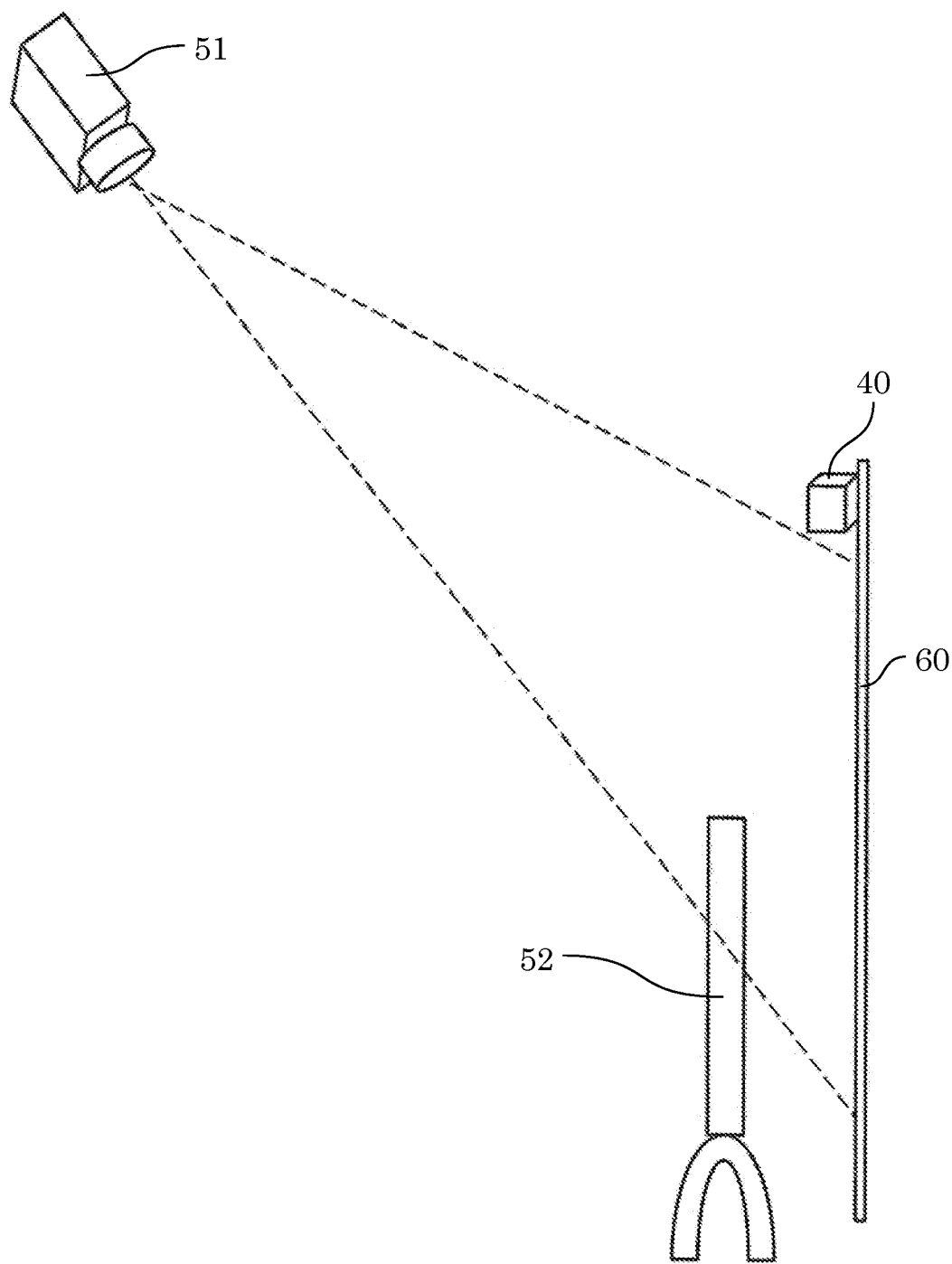
FIG. 2B is a side view illustrating an external appearance example of image display system 1 in FIG. 1.

FIG. 1 is a block diagram illustrating a configuration example of image display system 1 according to the first exemplary embodiment. FIGS. 2A and 2B are a front view and a side view illustrating an external appearance example of image display system 1 in FIG. 1.

With reference to FIGS. 1, 2A, and 2B, image display system 1 includes media server 10, image adjustment device 20, device characteristic database memory 30, an external light detection device which is illuminance sensor 40, a plurality of image display devices which is a set of projector 51 and display 52, and screen 60. Projector 51 is an example of a projection type image display device and a first image display device, and display 52 is an example of a light emission type image display device and a second image display device.

Media server 10 outputs the first image signal including the first image content to be displayed by projector 51 and the second image signal including the second image content to be displayed by display 52 to image adjustment device 20. Device characteristic database memory 30 includes a database that stores the characteristic data of projector 51 and display 52. In the present exemplary embodiment, device characteristic database memory 30 outputs external light contrast characteristics (to be described later), which are device characteristic data of projector 51 and display 52, to image adjustment device 20. Illuminance sensor 40 detects the current illuminance of external light on screen 60 and outputs illuminance data indicating the illuminance to image adjustment device 20.

Based on device characteristic data from device characteristic database memory 30 and illuminance data from illuminance sensor 40, image adjustment device 20 obtains contrast set values respectively corresponding to projector 51 and display 52 and outputs the contrast set values as first contrast information and second contrast information to projector 51 and display 52, respectively. These contrast set values are obtained such that the difference in contrast generated between the display images by projector 51 and display 52 is reduced. Furthermore, image adjustment device 20 outputs the first and second image signals from media server 10 to projector 51 and display 52, respectively. Projector 51 and display 52 change their own contrast set values based on the first contrast information and the second contrast information from image adjustment device 20. Further, projector 51 displays a first display image according to the first image signal from image adjustment device 20. Display 52 displays a second display image according to the second image signal from image adjustment device 20.

Note that first and second image contents are stored in an internal memory of media server 10 or acquired by media server 10 via a network (not illustrated). Further, device characteristic database memory 30 may be included in image adjustment device 20. Moreover, in order to acquire device characteristic data from device characteristic database memory 30, image adjustment device 20 may acquire identification codes or the like indicating devices from projector 51 and display 52 and request the device characteristic data of the corresponding devices.

Figure 3:
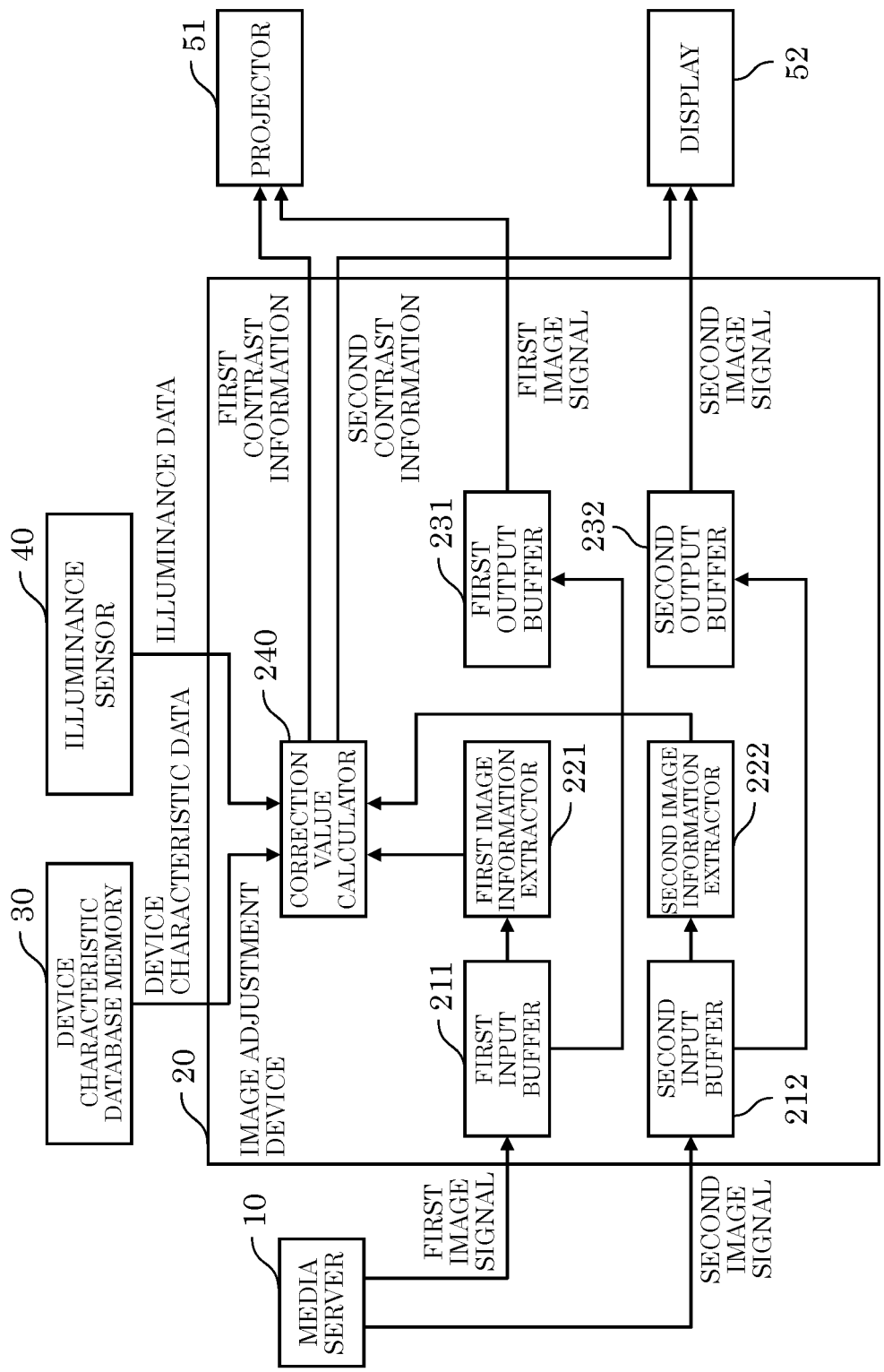
FIG. 3 is a block diagram illustrating a detailed configuration example of image adjustment device 20 in FIG. 1.

FIG. 3 is a block diagram illustrating a detailed configuration example of image adjustment device 20 in FIG. 1. With reference to FIG. 3, image adjustment device 20 includes first and second input buffers 211 and 212, first and second image information extractors 221 and 222, first and second output buffers 231 and 232, and correction value calculator 240.

With reference to FIG. 3, first input buffer 211 receives the first image signal from media server 10, temporarily stores the first image signal, and outputs the first image signal to first image information extractor 221 and first output buffer 231. First output buffer 231 temporarily stores the input first image signal and outputs the first image signal to projector 51. First image information extractor 221 extracts image content information such as the average luminance, contrast, and chromaticity of the image content included in the input first image signal and outputs the image content information to correction value calculator 240. Likewise, second input buffer 212 receives the second image signal from media server 10, temporarily stores the second image signal, and outputs the second image signal to second image information extractor 222 and second output buffer 232. Second output buffer 232 temporarily stores the input second image signal and outputs the second image signal to display 52. Second image information extractor 222 extracts the image content information of the image content included in the input second image signal and outputs the image content information to correction value calculator 240.

Correction value calculator 240 obtains the contrast set values of projector 51 and display 52 on the basis of the input device characteristic data and illuminance data so as to reduce the difference in contrast between the images displayed by projector 51 and display 52, outputs the first contrast information indicating the contrast set value of projector 51 to projector 51, and outputs the second contrast information indicating the contrast set value of display 52 to display 52.

Figure 4:
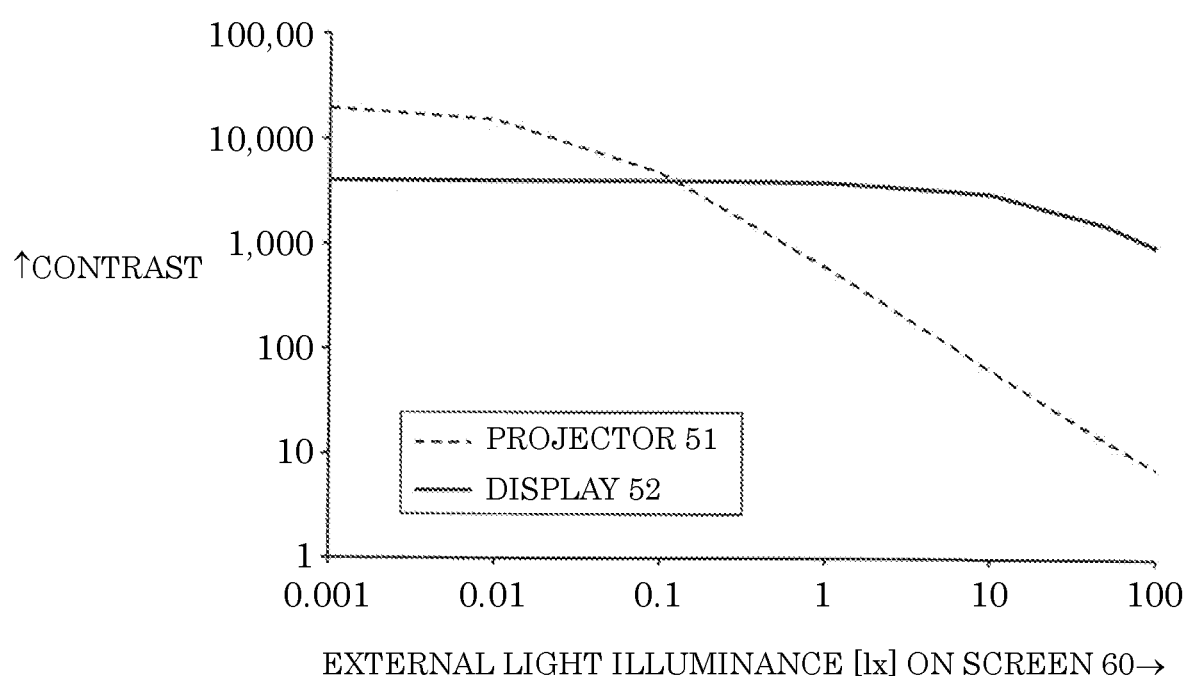
FIG. 4 is a graph illustrating a data configuration example of device characteristic data stored in device characteristic database memory 30 in FIG. 1.

FIG. 4 is a graph illustrating a data configuration example of device characteristic data stored in device characteristic database memory 30 in FIG. 1. FIG. 4 illustrates specific values (to be referred to as "external light contrast characteristics" hereinafter in this specification) indicating the contrast ratio values (to be referred to as contrasts hereinafter) of the images displayed on the image display devices in which contrast set values as predetermined values are set when the external light illuminance on screen 60 is a certain value. For example, when the external light illuminance on screen 60 is 1 lux, the contrast of the image displayed on display 52 is about 4000, and the contrast of the image displayed by projector 51 is about 700.

[1-2. Operation]

An operation of image display system 1 having the above configuration will be described below.

Figure 5A:
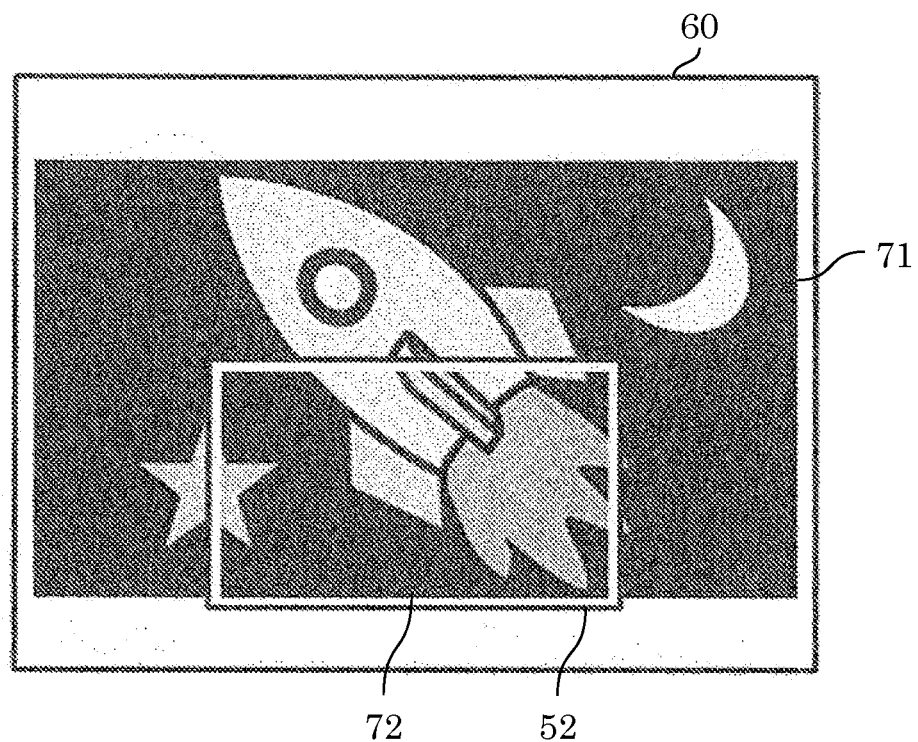
FIG. 5A is a front view illustrating an operation example of contrast correction in image display system 1 in FIG. 1.

FIGS. 5A to 5D are front views illustrating an operation example of contrast correction in image display system 1 in FIG. 1. FIG. 5A illustrates display examples of the images displayed by projector 51 and display 52. First and second display images 71 and 72 are displayed by dividing one image content into the first and second image contents of two regions on the basis of the positional relationship between projector 51 and display 52, outputting a first image signal including the divided first image content to projector 51, and outputting a second image signal including the second image content to display 52.

Figure 5B:
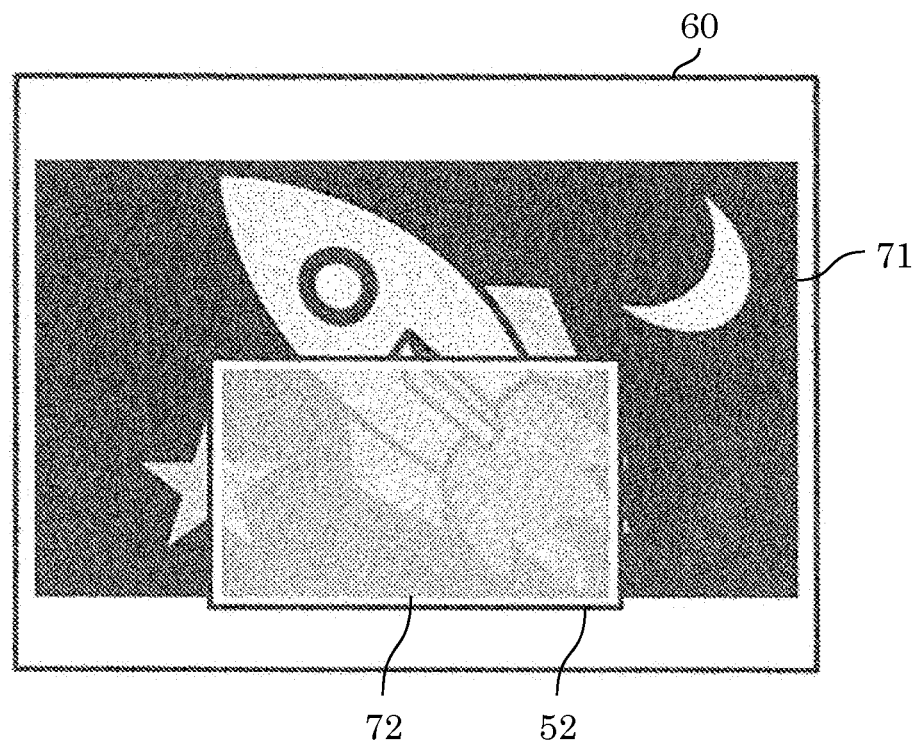
FIG. 5B is a front view illustrating an operation example of contrast correction in image display system 1 in FIG. 1.

FIG. 5B is a front view illustrating a display example of an image in a dark external light environment. There is a difference in external light contrast characteristics between projector 51 and display 52 as illustrated in FIG. 4. Therefore, for example, in a dark environment where the illuminance of external light is less than 0.1 lux, the contrast of projector 51 is higher than the contrast of display 52. As a result, first display image 71 by projector 51 has a higher contrast than second display image 72 by display 52 as illustrated in FIG. 5B. As a result, a contrast difference is generated between the two display images, and the continuity of the two display images is impaired.

Figure 5C:
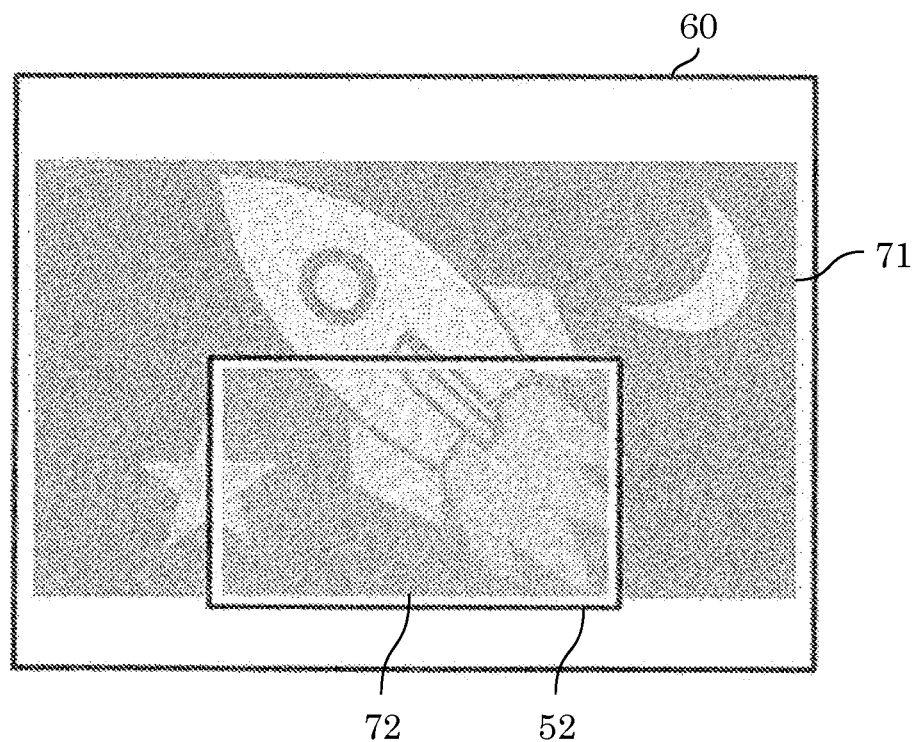
FIG. 5C is a front view illustrating an operation example of contrast correction in image display system 1 in FIG. 1.

Therefore, image adjustment device 20 corrects the contrast difference as follows based on the external light contrast characteristic from device characteristic database memory 30 and the illuminance data from illuminance sensor 40. FIG. 5C illustrates a display example of the image subjected to contrast correction.

Specifically, correction value calculator 240 of image adjustment device 20 outputs the first contrast information indicating a contrast set value lower than a predetermined value to projector 51 that displays first display image 71 having a higher contrast than second display image 72 by display 52 at the current illuminance. Since projector 51 decreases the contrast set value in accordance with the input first contrast information, the contrast of first display image 71 by projector 51 decreases and approaches the contrast of second display image 72 on display 52. In this case, the contrast set value of the first contrast information to be output to projector 51 is set to such a value that the contrasts of the display images by projector 51 and display 52 substantially coincide with each other. As a result, as illustrated in FIG. 5C, the continuity regarding the contrasts of these display images can be improved.

Figure 5D:
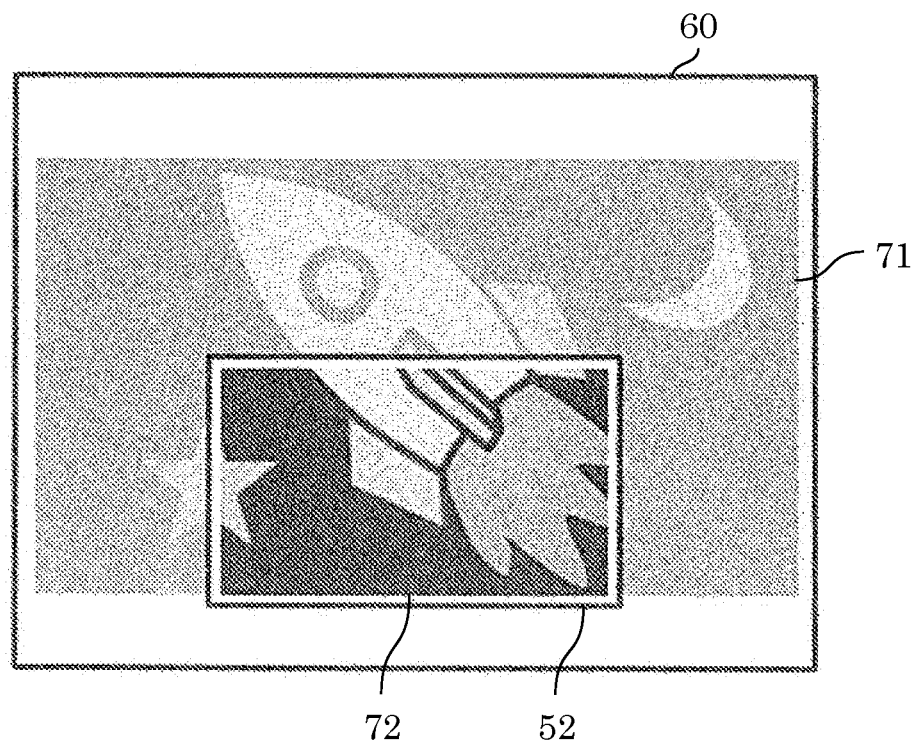
FIG. 5D is a front view illustrating an operation example of contrast correction in image display system 1 in FIG. 1.

FIG. 5D is a front view illustrating a display example of an image in a bright external light environment. For example, in a bright environment where the illuminance of external light exceeds 0.2 lux, the contrast of projector 51 becomes lower than the contrast of display 52, and the continuity of the two display images by projector 51 and display 52 is impaired. Accordingly, correction value calculator 240 of image adjustment device 20 outputs the second contrast information indicating the contrast set value lower than the predetermined value to display 52 that displays second display image 72 having a higher contrast than first display image 71 of projector 51 at the current illuminance. As a result, similarly to the case of the dark external light environment, the contrast of second display image 72 by display 52 decreases and approaches the contrast of first display image 71 by projector 51. In this case, by setting the contrast set value of the second contrast information to be output to display 52 to such a value that the contrasts of the display images by projector 51 and display 52 substantially coincide with each other, it is possible to improve the continuity regarding the contrasts of the two display images as illustrated in FIG. 5C.

Note that correction value calculator 240 may set a predetermined lower limit value to the contrast set value in order to prevent the display image itself from being unclear due to an excessive decrease in the contrast set value of the image display device.

[1-3. Effects and Others]

As described above, in the present exemplary embodiment, based on the illuminance of the external light detected by the external light detection device, image display system 1 changes the contrast set value of each image display device such that a difference in contrast between two display images is reduced between two image display devices having different external light contrast characteristics. This reduces a difference in contrast generated between the two display images and improves continuity in contrast between the two display images.

(Second Exemplary Embodiment)

Figure 6:
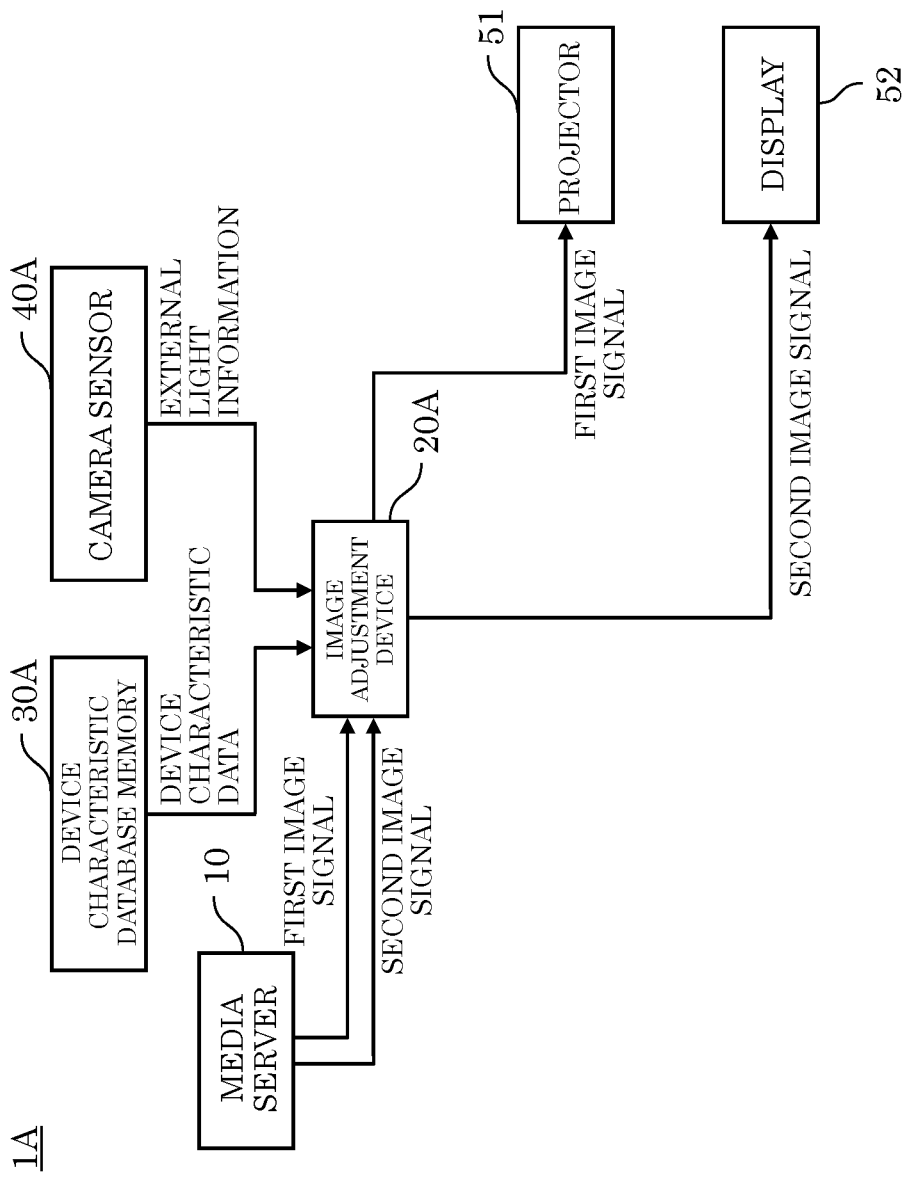
FIG. 6 is a block diagram illustrating a configuration example of image display system 1 according to a second exemplary embodiment.
Figure 7:
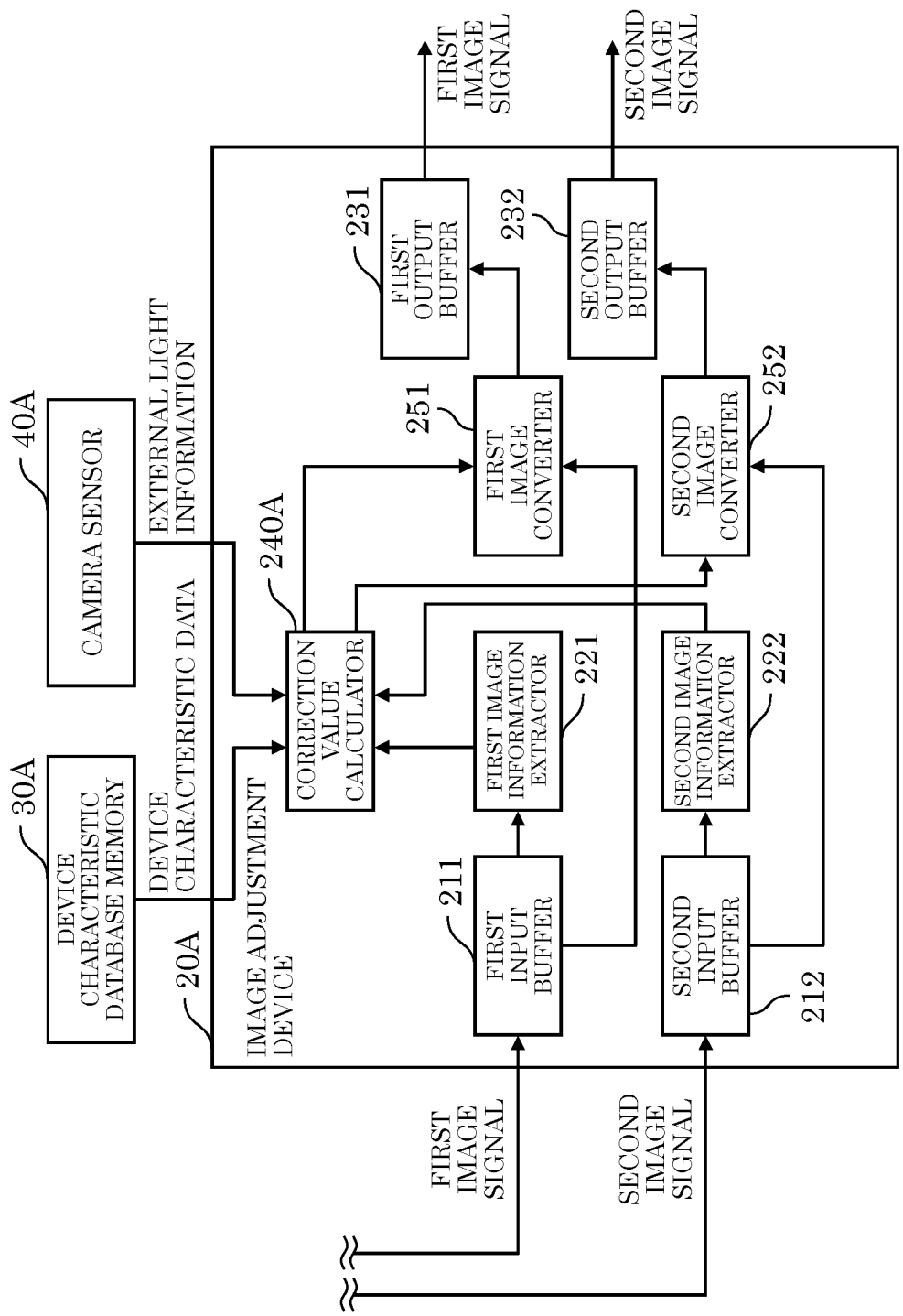
FIG. 7 is a block diagram illustrating a detailed configuration example of image adjustment device 20A in FIG. 6.

FIG. 6 is a block diagram illustrating a configuration example of image display system 1A according to a second exemplary embodiment. FIG. 7 is a block diagram illustrating a detailed configuration example of image adjustment device 20A in FIG. 6. Image display system 1A is different from image display system 1 in FIG. 1 in the following points.

(1) As an external light detection device, a camera sensor 40A is provided instead of illuminance sensor 40.

(2) Device characteristic database memory 30A outputs an external light chromaticity characteristic instead of the external light contrast characteristic to correction value calculator 240A of image adjustment device 20A as device characteristic data.

(3) Correction value calculator 240A is provided instead of correction value calculator 240. With reference to FIG. 6, camera sensor 40A detects the chromaticity, luminance, and the like of external light instead of external light illuminance on screen 60 and outputs external light information to image adjustment device 20A.

As illustrated in FIG. 7, image adjustment device 20A includes first and second image converters 251 and 252 in addition to image adjustment device 20 in FIG. 3. Based on the external light chromaticity characteristic from device characteristic database memory 30A and the external light information from camera sensor 40A, correction value calculator 240A obtains a chromaticity correction value that reduces the difference in chromaticity generated between two first and second display images 71 and 72 and outputs the chromaticity correction value to first and second image converters 251 and 252.

Figure 8A:
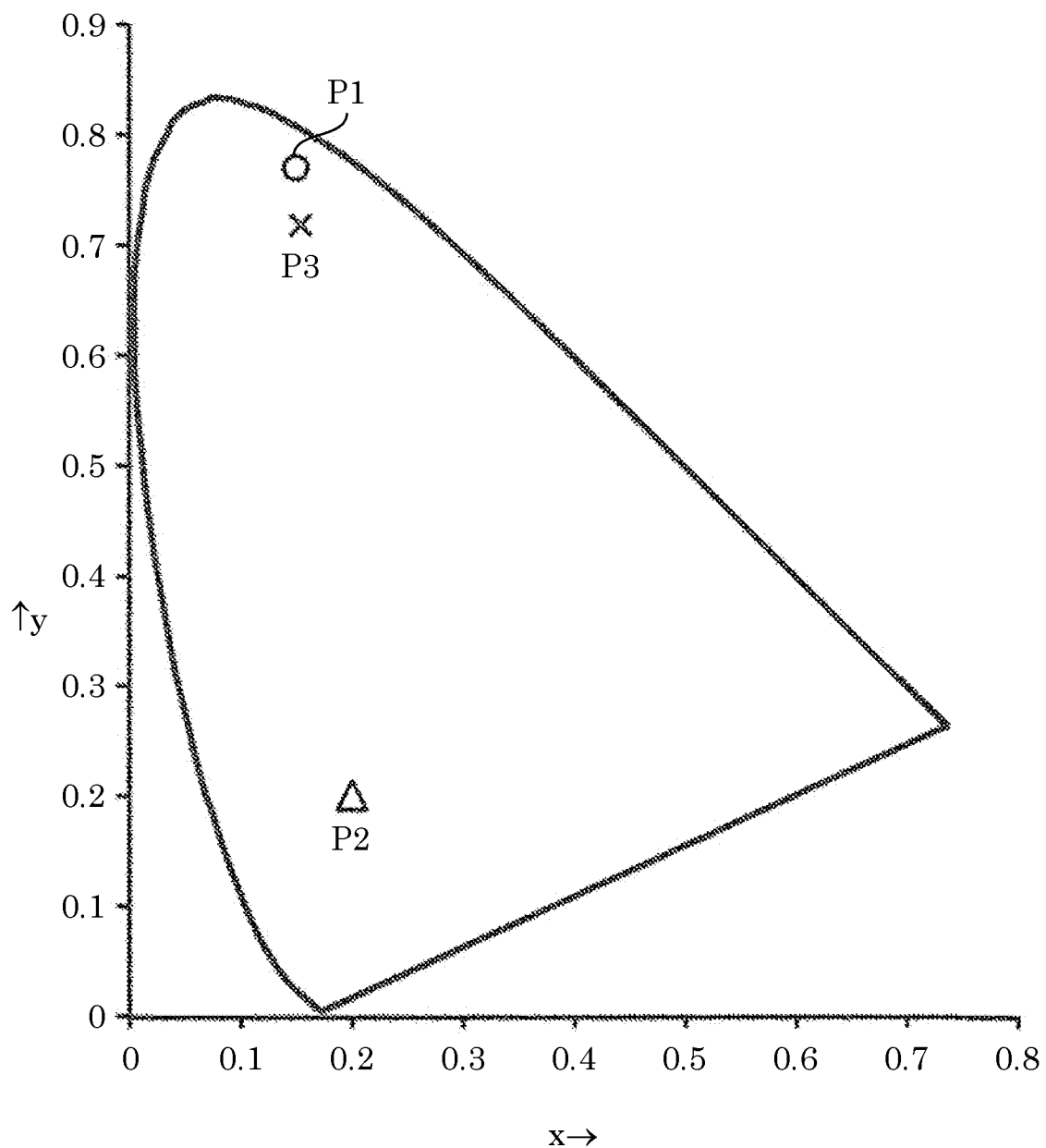
FIG. 8A is a CIE chromaticity diagram illustrating an operation example of chromaticity correction in image display system 1A in FIG. 6.
Figure 8B:
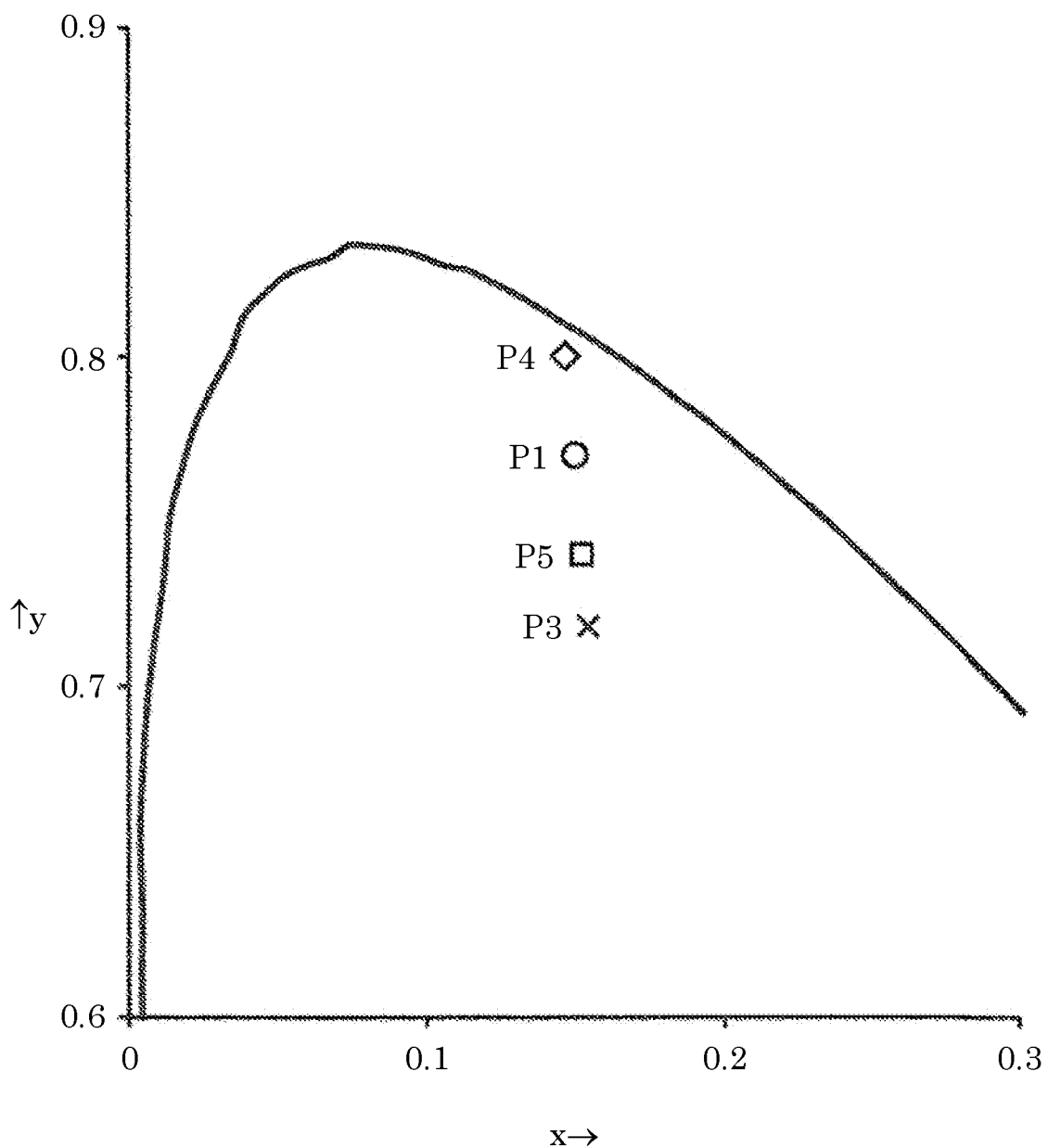
FIG. 8B is an enlarged view of FIG. 8A.

A chromaticity correction operation of image display system 1A will be described with reference to FIGS. 8A and 8B. FIG. 8A is a CIE chromaticity diagram illustrating an operation example of chromaticity correction in image display system 1A in FIG. 6. FIG. 8B is an enlarged view of FIG. 8A. Consider first a case in which both projector 51 and display 52 are made to display an image of the color (green) of same point P1. Point P2 indicates the chromaticity (blue) of external light on screen 60, which is detected by camera sensor 40A.

With reference to FIG. 8A, when projector 51 projects an image of the color of point P1 onto screen 60, the external light of the color of point P2 is reflected on screen 60, so that the display color of the display image by projector 51 is shifted toward point P2 and becomes the color of point P3. On the other hand, second display image 72 by display 52 is less likely to be affected by external light than projector 51, and an image of substantially the color of point P1 is displayed. As described above, since projector 51 is affected by external light more than display 52, a difference in chromaticity occurs between the two image display devices. Since this chromaticity difference occurs for images of any colors, the image displayed by projector 51 is bluish as compared with the image displayed by display 52. As described above, a difference in chromaticity occurs between two display images of two image display devices having different susceptibilities to external light (external light chromaticity characteristics), and continuity of the two display images is impaired.

Accordingly, as illustrated in FIG. 8B, image adjustment device 20A shifts the color of point P1 of first display image 71 displayed by projector 51 to point P4 in a direction opposite to point P2. Consequently, the color displayed on first display image 71 by projector 51 is combined with the external light of the color of point P2 to become the color indicated by point P5. Further, the color of point P1 of second display image 72 displayed on display 52 is shifted from point P1 toward point P2 to be the color of point P5. As a result, both projector 51 and display 52 display the same color of point P5 for the image content that causes projector 51 and display 52 to display the same color of point P1. By performing this correction on the entire image, the difference in chromaticity generated between the two display images is reduced, and continuity in chromaticity is improved between two first and second display images 71 and 72.

Specifically, correction value calculator 240A calculates the first and second correction values for shifting the color as described above on the basis of device characteristic data (including the external light chromaticity characteristic) from device characteristic database memory 30A and external light information from camera sensor 40A and outputs the first and second correction values to first and second image converters 251 and 252, respectively. In response to this, first and second image converters 251 and 252 shift the chromaticities of the image signals input from first and second input buffers 211 and 212 by the first and second correction values and then output the corrected first and second image signals to projector 51 and display 52 via first and second output buffers 231 and 232, respectively. As a result, projector 51 and display 52 display two display images with improved continuity regarding chromaticity. Note that first and second image converters 251 and 252 of image display system 1A according to the present exemplary embodiment may further correct and convert the contrasts of first and second display images 71 and 72. Consequently, similarly to the first exemplary embodiment, the difference in contrast generated between two first and second display images 71 and 72 can be reduced, and the continuity concerning contrast can also be improved.

(Third Exemplary Embodiment)

Figure 9:
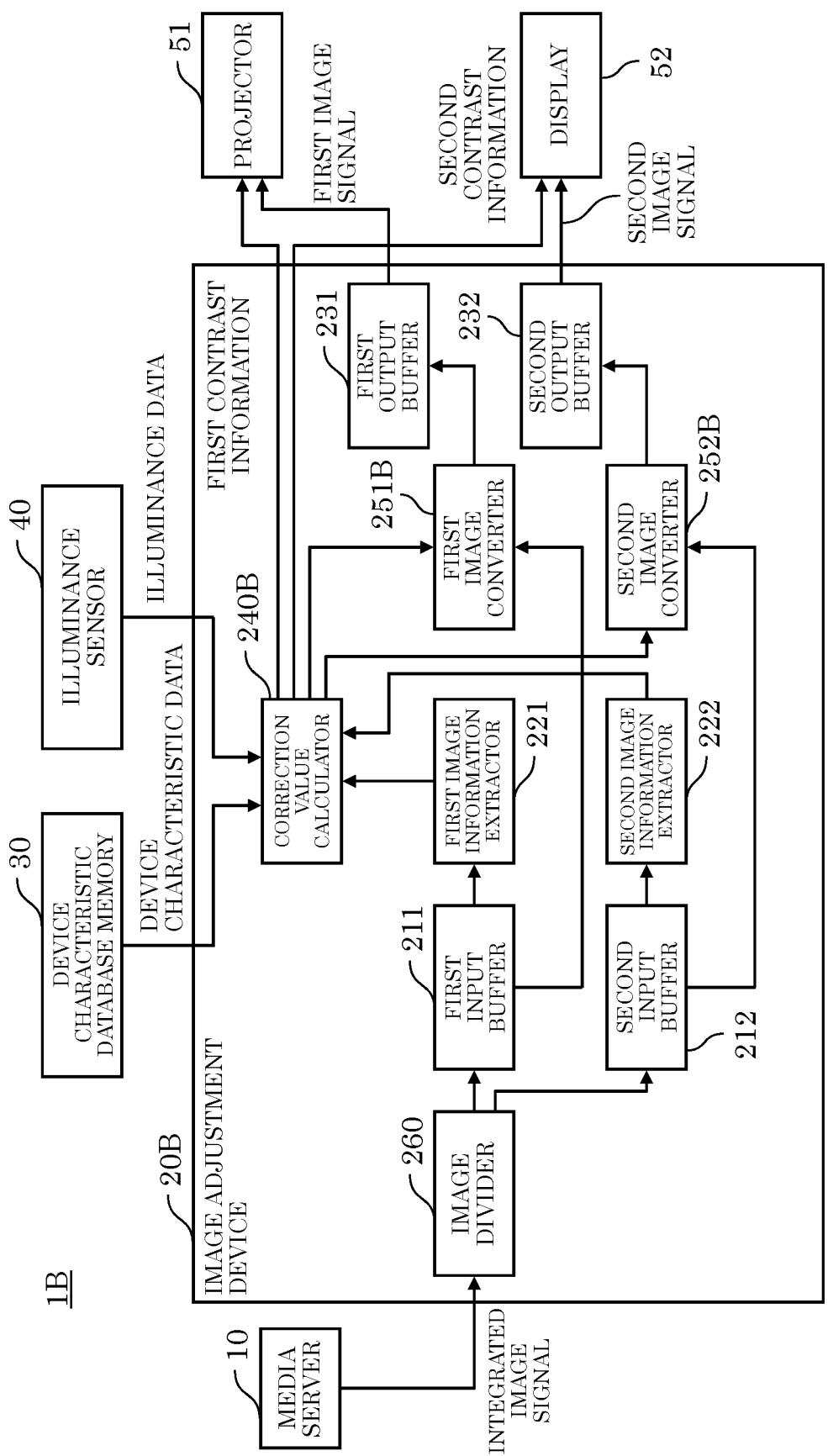
FIG. 9 is a block diagram illustrating a configuration example of image display system 1B according to a third exemplary embodiment.

FIG. 9 is a block diagram illustrating a configuration example of image display system 1B according to a third exemplary embodiment. With reference to FIG. 9, image display system 1B is different from image display system 1 in FIG. 1 in the following points.

(1) Image adjustment device 20B is provided instead of image adjustment device 20, and image adjustment device 20B further includes image divider 260.

(2) Media server 10 outputs an integrated image signal including one piece of integrated image content to image divider 260 of image adjustment device 20B.

(3) Image divider 260 divides the integrated image content included in the input integrated image signal into two image contents and outputs the image contents as image signals to first and second input buffers 211 and 212.

(4) Image adjustment device 20 B further includes first and second image converters 251B and 252B and includes correction value calculator 240B instead of correction value calculator 240.

Figure 10A:
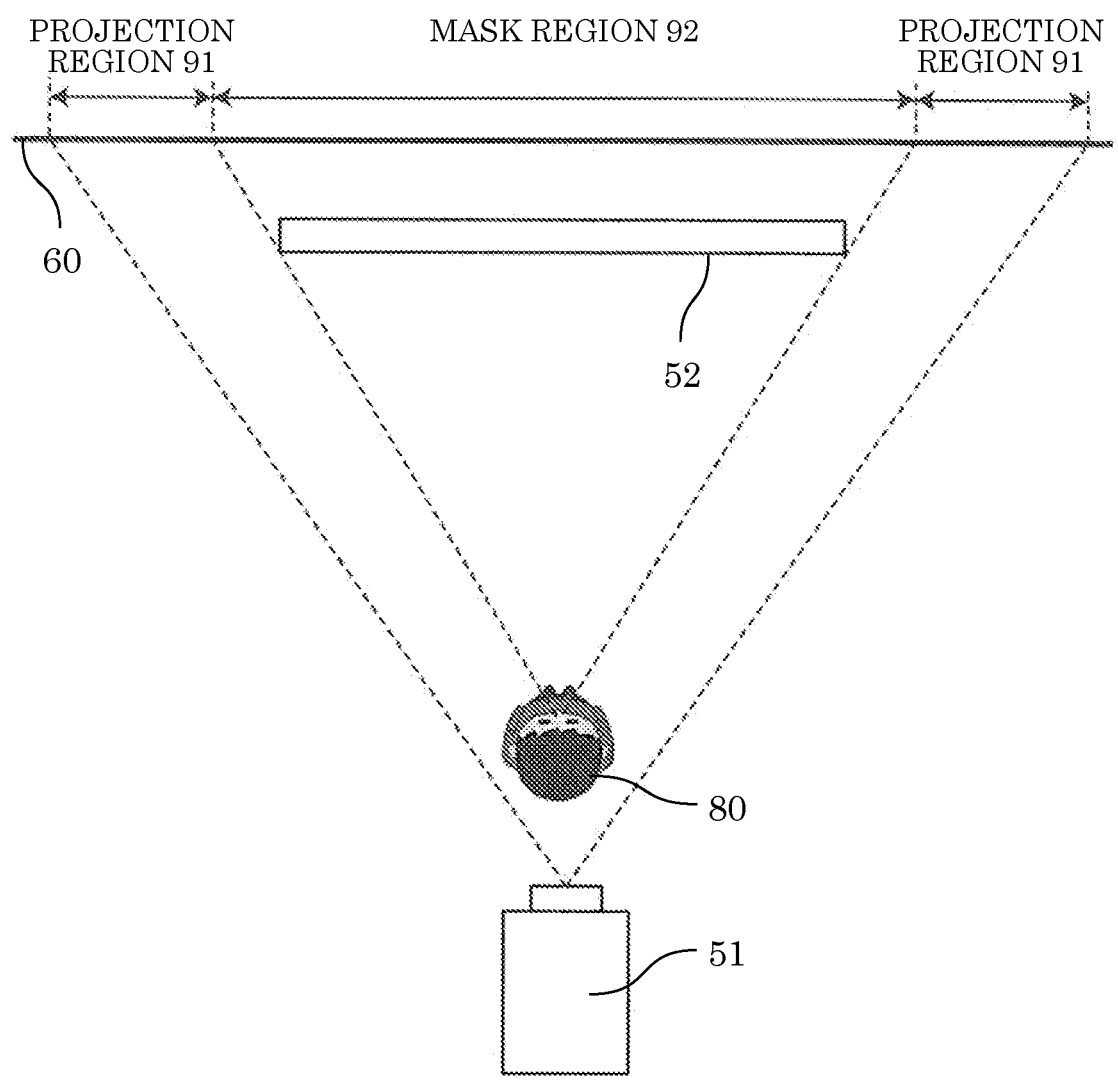
FIG. 10A is a top view illustrating a positional relationship among projector 51, display 52, screen 60, and user 80 in image display system 1B in FIG. 9.
Figure 10B:
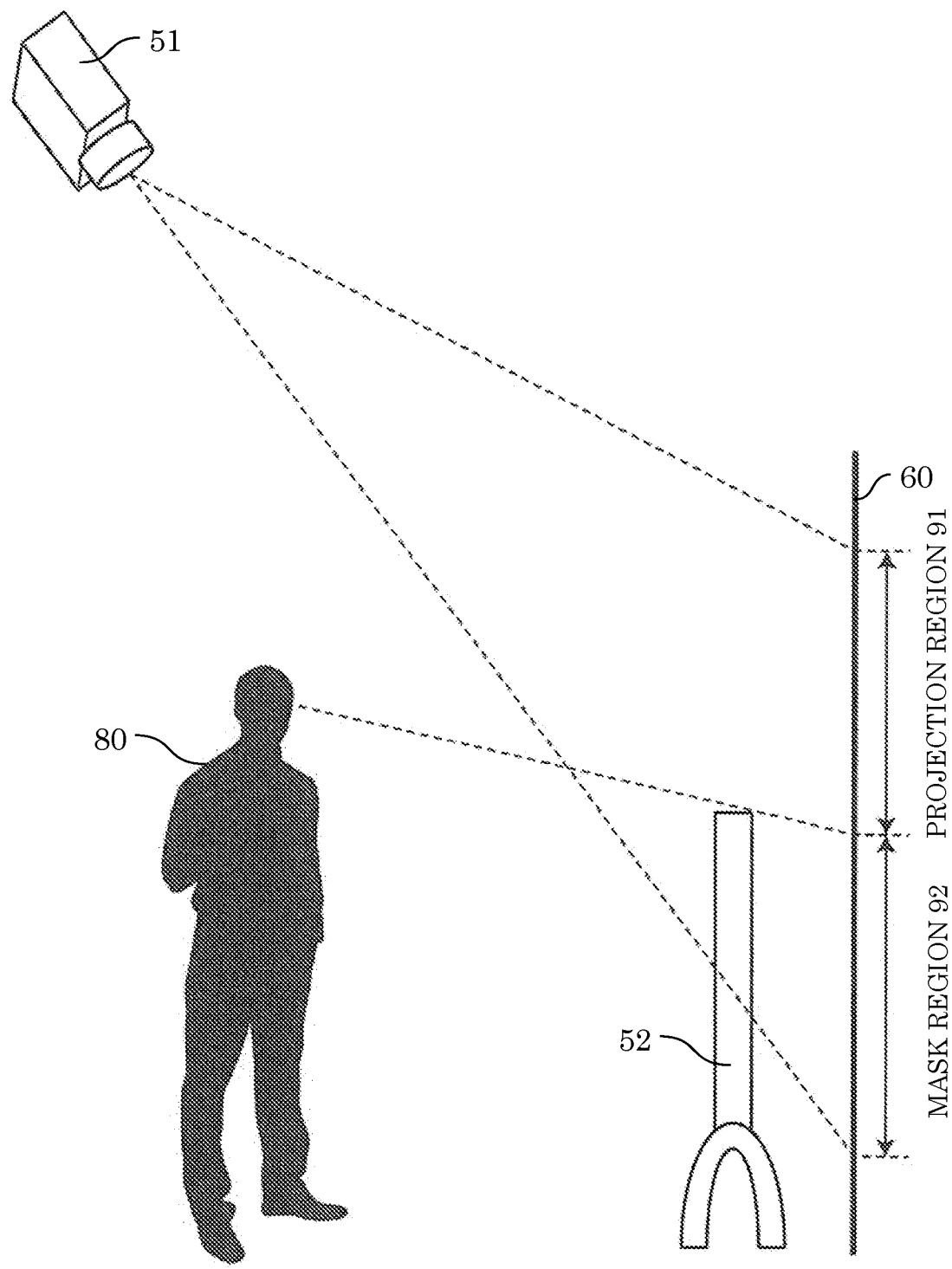
FIG. 10B is a side view illustrating the positional relationship among projector 51, display 52, screen 60, and user 80 in image display system 1B in FIG. 9.

FIGS. 10A and 10B are a top view and a side view illustrating a positional relationship among projector 51, display 52, screen 60, and user 80 in image display system 1B in FIG. 9, respectively. As in the first and second exemplary embodiments, projector 51 projects an image onto screen 60.

However, in a case in which display 52 and screen 60 overlap as illustrated in FIG. 10A, when first display image 71 is projected on the entire region on which projector 51 can project, first display image 71 is also projected on display 52. Accordingly, projector 51 projects an image only on a region of screen 60 that user 80 can see, and does not project an image on other regions (black display).

In FIGS. 10A and 10B, the viewpoint of user 80 is at a predetermined position. In screen 60, a region visible from the viewpoint position of user 80 is referred to as projection region 91, and a region hidden by display 52 and invisible to user 80 is referred to as mask region 92.

Based on the positional relationship among projector 51, screen 60, display 52, and the predetermined viewpoint position of the user 80, image adjustment device 20B divides and outputs an integrated image content such that display 52 and mask region 92 just overlap with each other when viewed from user 80. Specifically, first, image divider 260 divides the integrated image content included in an integrated image signal from media server 10 into a region to be displayed on display 52 and a region to be displayed on projection region 91 of screen 60 via projector 51.

On the basis of the positional relationship among projector 51, screen 60, display 52, and a predetermined viewpoint position of user 80, correction value calculator 240B obtains a first correction value, which is a parameter for deforming the first image content for allowing mask region 92 to just overlap display 52 as viewed from user 80, and outputs the first correction value to first image converter 251B. The deformation includes translation and scaling in a planar direction of screen 60 and geometric transformation such as trapezoidal deformation. First image converter 251B deforms the first image content to be displayed by projector 51 in accordance with the first correction value from correction value calculator 240B and outputs the first image content to projector 51 via first output buffer 231.

Correction value calculator 240B obtains the second correction value that is the shift amount in the vertical direction and the horizontal direction of the second image content and outputs the second correction value to second image converter 252B. Second image converter 252B shifts the second image content to be displayed on display 52 in accordance with the second correction value from correction value calculator 240B. In the present exemplary embodiment, since the second image content to be displayed on display 52 is not shifted, the second correction value is 0, and second image converter 252B outputs the second image signal from second input buffer 212 without any change.

Further, image adjustment device 20B performs contrast correction on the divided first and second image contents similarly to the first exemplary embodiment and outputs the first and second image signals to projector 51 and display 52. Note that the division boundary may be a predetermined boundary line obtained in advance on the basis of the positional relationship among projector 51, screen 60, display 52, and a predetermined viewpoint position.

Figure 11:
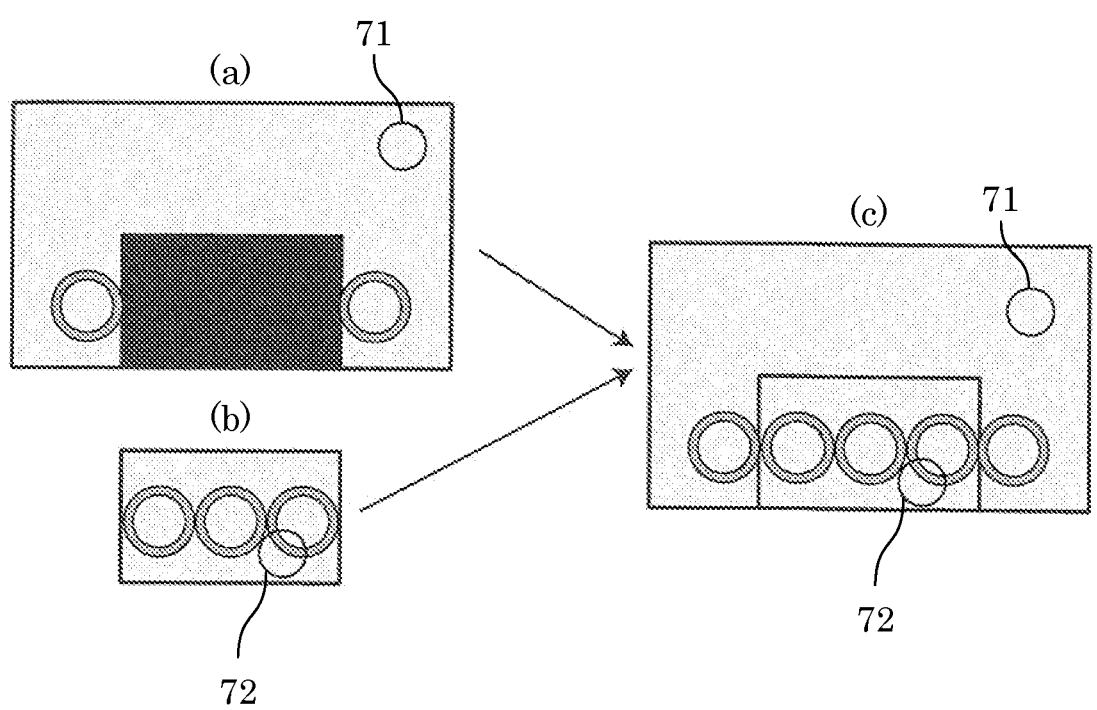
FIG. 11 is a projection view illustrating an operation example of image display system 1B in FIG. 9.

FIG. 11 is a projection view illustrating an operation example of image display system 1B in FIG. 9. Part (a) of FIG. 11 illustrates first display image 71 input to projector 51, and part (b) of FIG. 11 illustrates second display image 72 input to display 52. When first display image 71 is displayed on projection region 91 of screen 60 and second display image 72 is displayed on display 52 overlapping mask region 92 of screen 60, user 80 can observe an image in which first display image 71 and second display image 72 are continuous as illustrated in part (c) of FIG. 11 when viewing from the viewpoint of user 80.

(Fourth Exemplary Embodiment)

Figure 12:
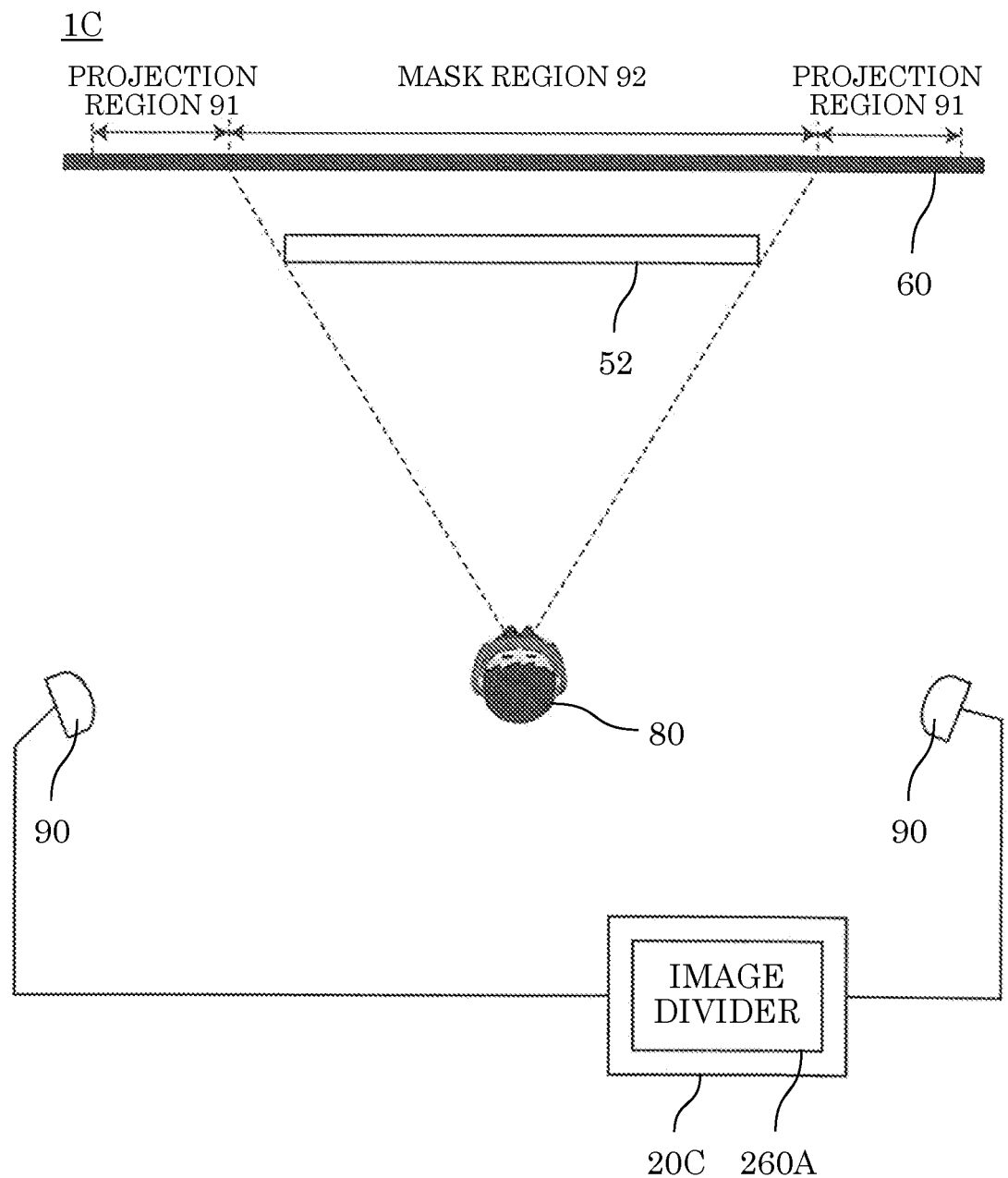
FIG. 12 is a top view illustrating a configuration example of image display system 1C according to a fourth exemplary embodiment.

FIG. 12 is a top view illustrating a configuration example of image display system 1C according to a fourth exemplary embodiment. Image display system 1C is different from image display system 1B according to the third exemplary embodiment in the following points.

(1) Viewpoint sensor 90 is further provided.

(2) Image adjustment device 20C including image divider 260A is provided instead of image adjustment device 20B including image divider 260.

Viewpoint sensor 90 detects the position of the viewpoint of user 80 and transmits the viewpoint position data to image divider 260A of image adjustment device 20C. Image divider 260A divides an image on the basis of viewpoint position data. A specific dividing operation will be described below.

Figure 13A:
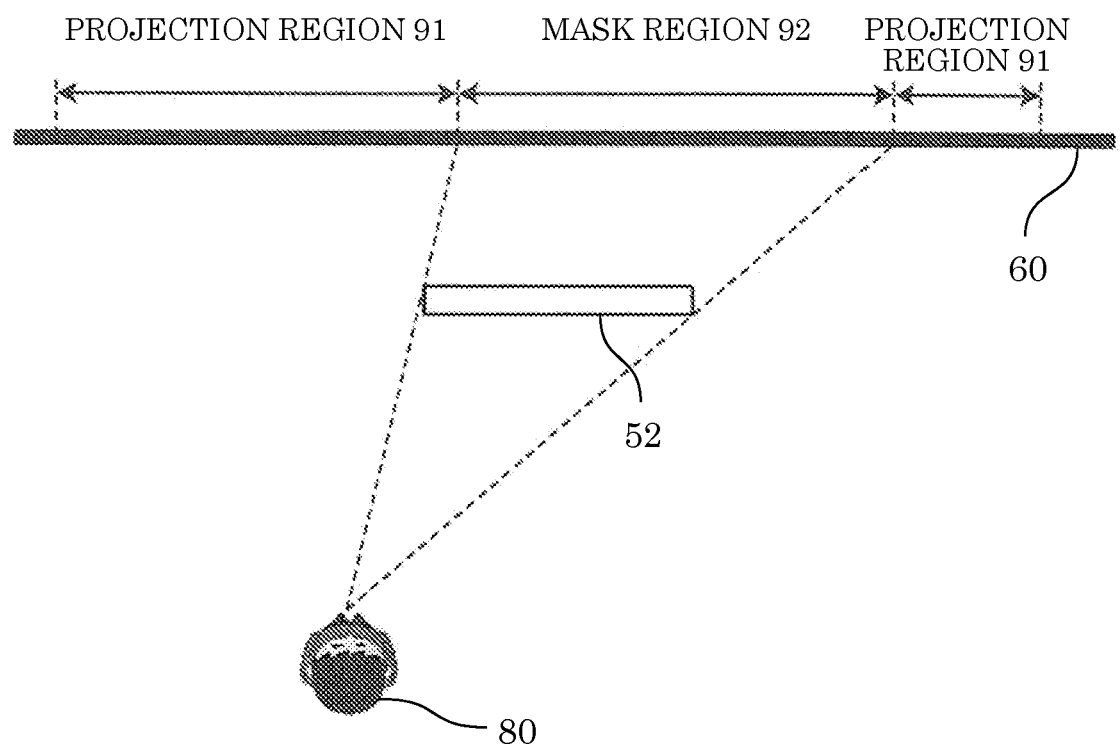
FIG. 13A is a top view illustrating a positional relationship between the constituent elements of image display system 1C in FIG. 12 and user 80.

FIG. 13A is a top view illustrating a positional relationship among display 52 and screen 60 when the viewpoint of user 80 is shifted to the left in image display system in FIG. 12. With reference to FIG. 13A, the viewpoint position of user 80 is shifted to the left from the predetermined position in FIG. 12. As a result, mask region 92 that is hidden by display 52 on screen 60 shifts to the right as compared with a case in which the viewpoint of user 80 is at a predetermined position. Accordingly, when the same image as that in the case in which the viewpoint of user 80 is not moved is displayed by projector 51 and display 52, a part of second display image 72 displayed on screen 60 overlaps display 52 and cannot be seen, and a region on which second display image 72 is not projected is seen on screen 60.

Accordingly, image divider 260A of image adjustment device 20C divides the integrated image content included in the integrated image signal from media server 10 on the basis of the viewpoint position of user 80. This content is divided into a region to be displayed on display 52 and a region to be displayed on current projection region 91 of screen 60 on the basis of the positional relationship among projector 51, screen 60, display 52, and the viewpoint of user 80. Two specific examples of this division will be described with reference to FIGS. 13B and 13C.

Figure 13B:
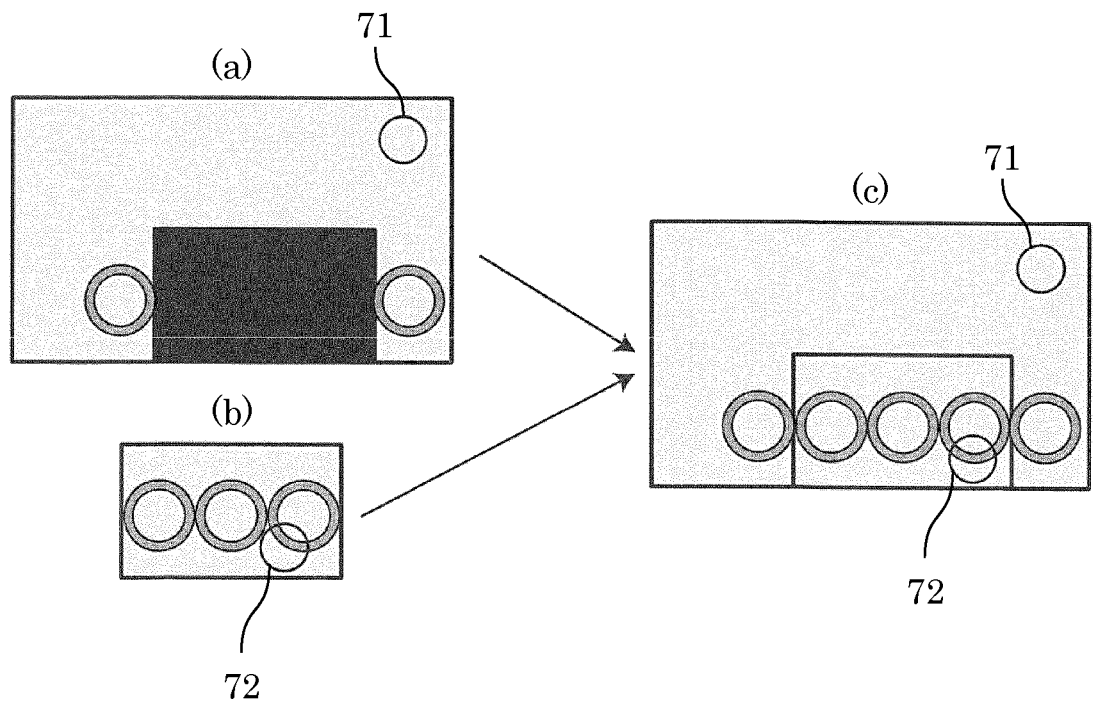
FIG. 13B is a projection view illustrating an operation example of a dividing operation in image display system 1C in FIG. 12.

FIG. 13B is a projection view illustrating an operation example of a dividing operation in image display system 1C in FIG. 12. With reference to FIG. 13B, part (a) illustrates an image content input to projector 51, and part (b) illustrates an image content input to display 52. In the method in FIG. 13B, the image to be displayed by projector 51 is also deformed to be shifted to the right in response to mask region 92 being shifted to the right. This can be implemented by, for example, further adding first image converter 251 in FIG. 7 (second exemplary embodiment) to image adjustment device 20C and deforming the first image content to be displayed by projector 51 so as to shift to the right in accordance with the correction value obtained by correction value calculator 240 based on the detected viewpoint position of user 80. When the image contents divided and corrected in this way are displayed through projector 51 and display 52, user 80 can observe the continuous image of first display image 71 and second display image 72 as illustrated in part (c) of FIG. 13B when viewing from the viewpoint position of user 80.

Figure 13C:
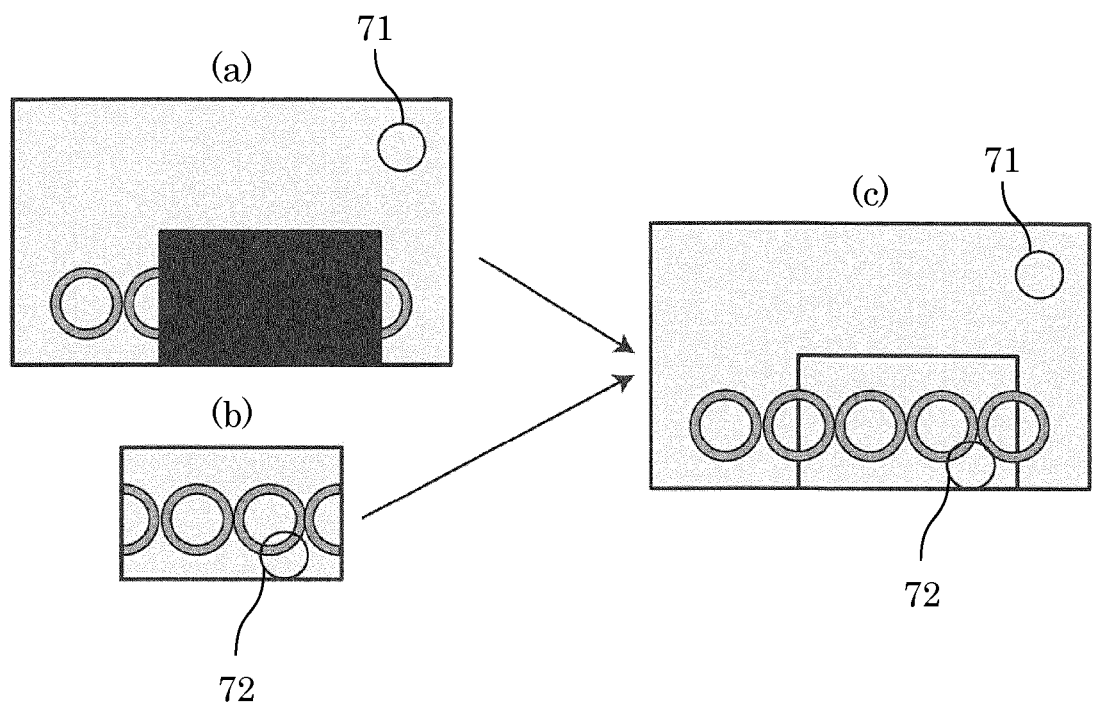
FIG. 13C is a projection view illustrating another operation example of the dividing operation in image display system 1C in FIG. 12.

FIG. 13C is a projection view illustrating another operation example of a dividing operation in image display system 1C in FIG. 12. With reference to FIG. 13C, part (a) illustrates an image content input to projector 51, and part (b) illustrates an image content input to display 52. In the method in FIG. 13C, the image to be displayed on display 52 is shifted to the left by a method similar to the method in FIG. 13B in correspondence with mask region 92 being shifted to the right. When the image contents divided and corrected in this way are displayed through projector 51 and display 52, user 80 can observe the continuous image of first display image 71 and second display image 72 as illustrated in part (c) of FIG. 13C when viewing from the viewpoint position of user 80.

In this manner, viewpoint sensor 90 detects the viewpoint position of user 80, and image adjustment device 20C converts the image content or divides the integrated image content on the basis of the detected viewpoint position, thereby reducing the deviation between first and second display images 71 and 72 by projector 51 and display 52 and improving the continuity of the display image. Although the present exemplary embodiment has exemplified only the case in which the viewpoint moves to the left, similar correction can be performed for the movement of the viewpoint position including upward and downward movement, leftward and rightward movement, forward and backward movement, and combinations of them.

Fifth Exemplary Embodiment

Figure 14A:
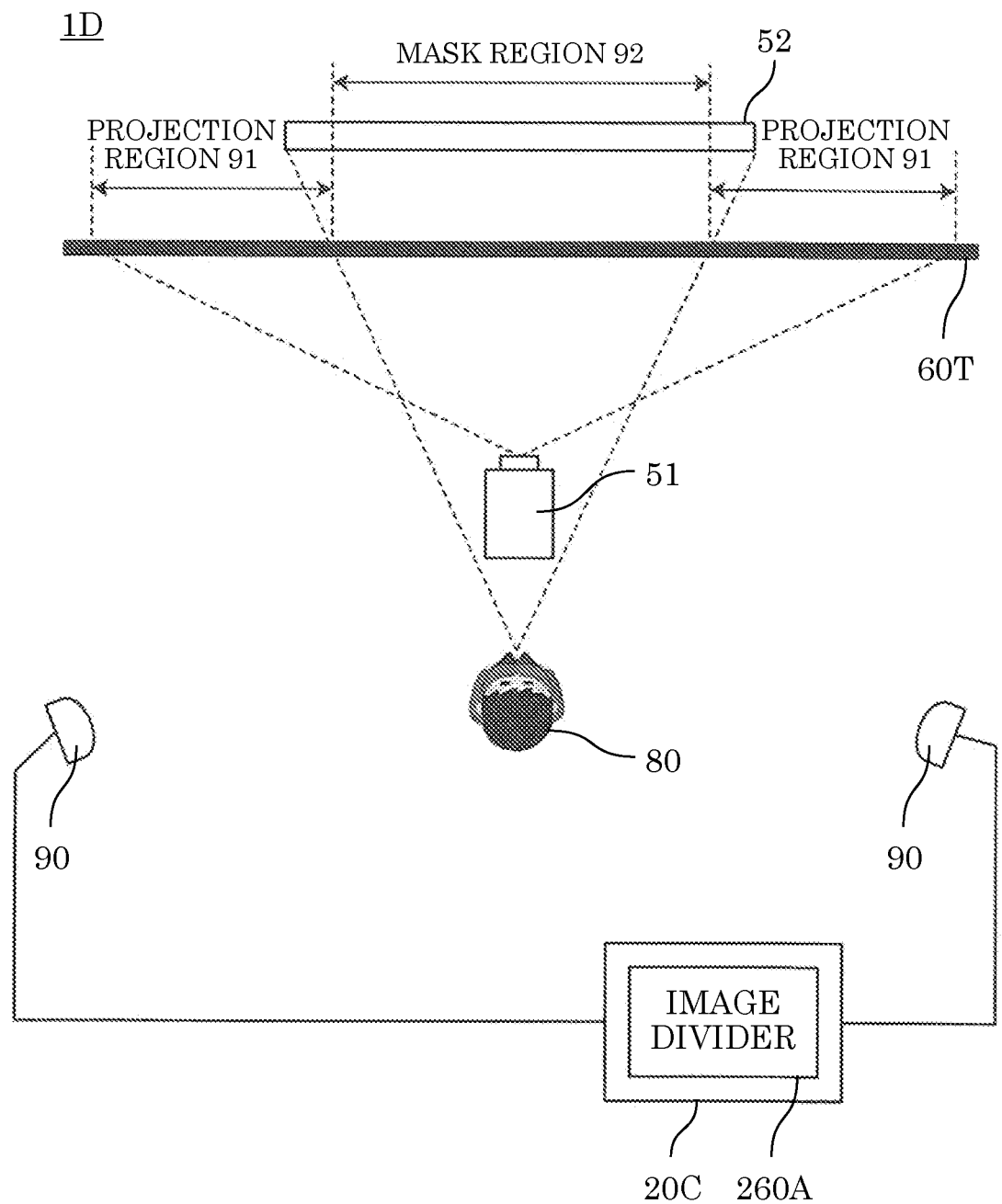
FIG. 14A is a top view illustrating a configuration example of image display system 1D according to a fifth exemplary embodiment.
Figure 14B:
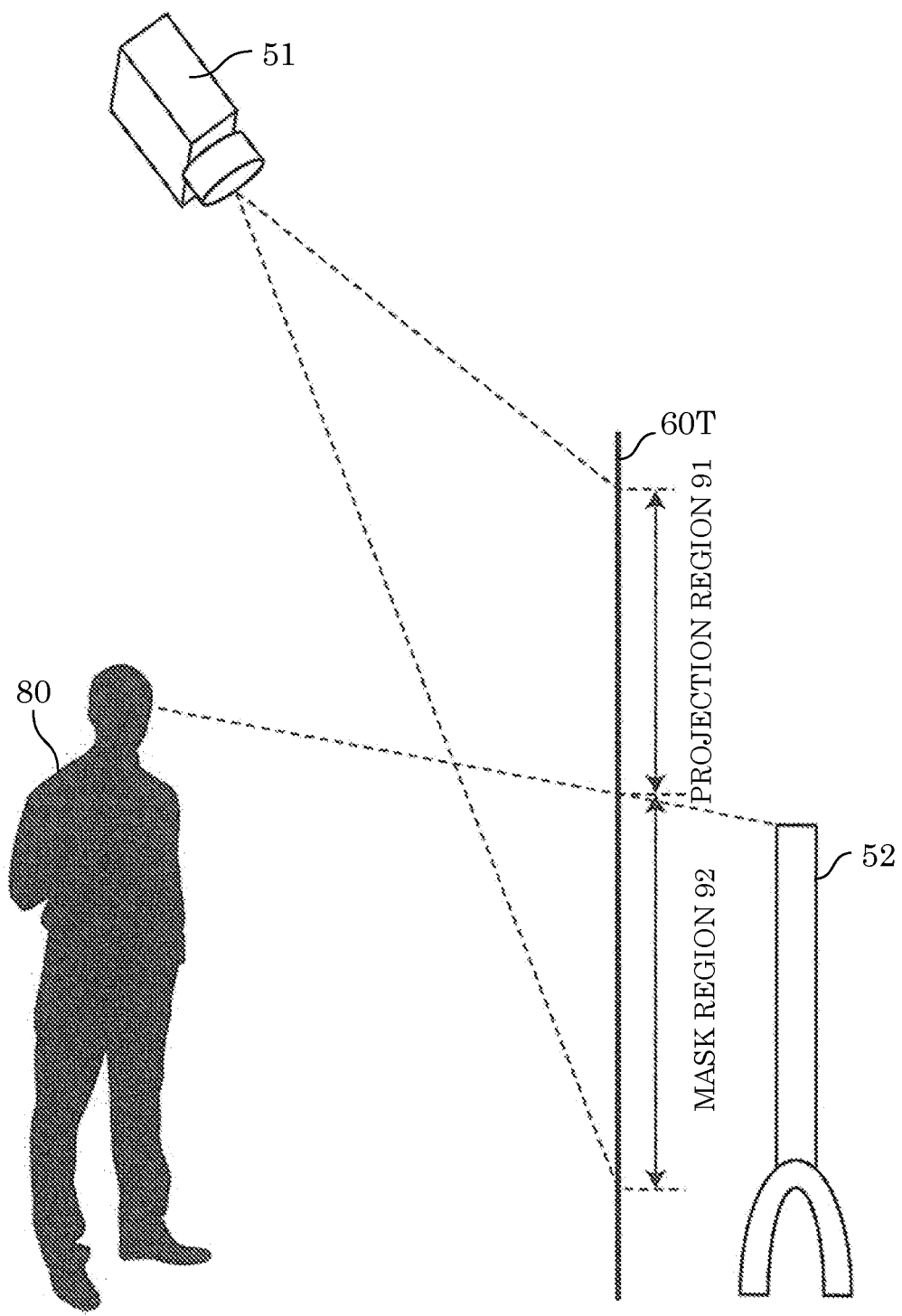
FIG. 14B is a side view illustrating an external appearance example of image display system 1D in FIG. 14A.

FIGS. 14A and 14B are a top view and a side view, respectively, illustrating a configuration example of image display system 1D according to a fifth exemplary embodiment. Image display system 1D is different from image display system 1C in FIG. 12 in the following points.

(1) Screen 60 T has transparency and is closer to user 80 than display 52 is.

First display image 71 from projector 51 is projected on projection region 91 of transparent screen 60T. Second display image 72 displayed on display 52 is transmitted through transparent screen 60T and is observed by user 80.

Figure 15A:
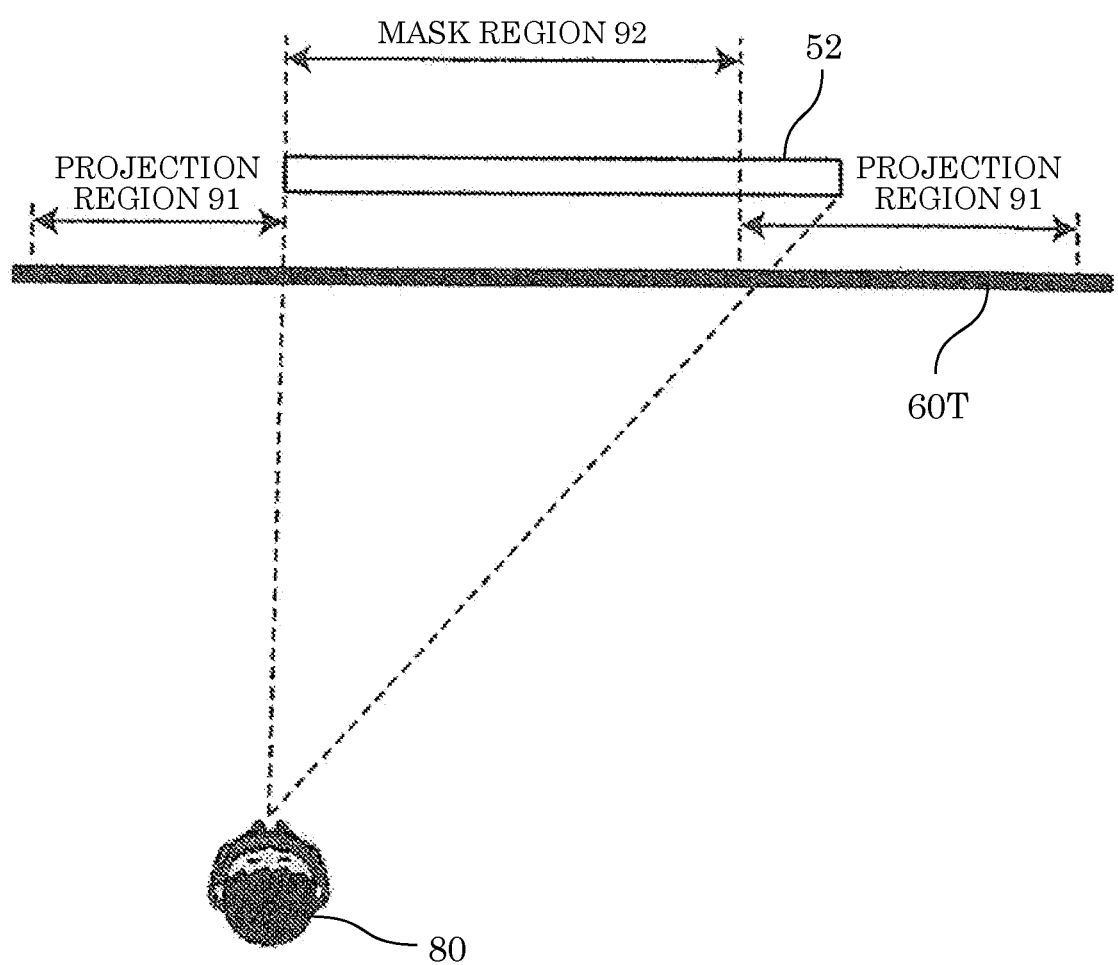
FIG. 15A is a top view illustrating a positional relationship among display 52, screen 60, and user 80 when the viewpoint of user 80 is shifted to the left in image display system 1D in FIG. 14A.
Figure 15B:
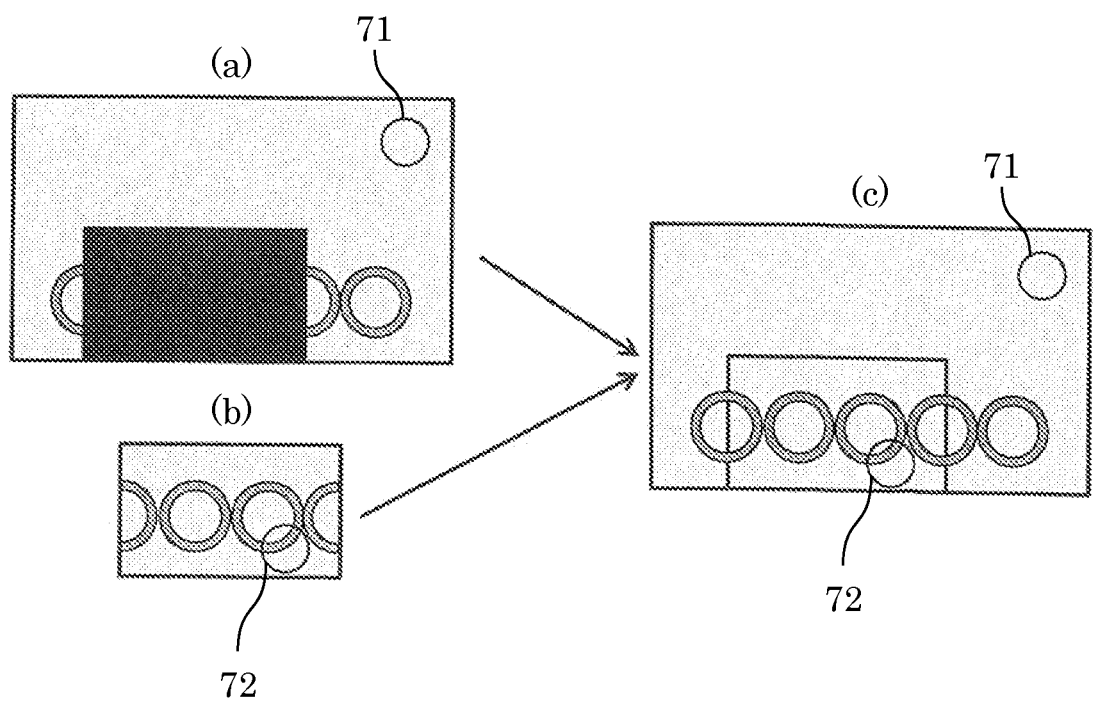
FIG. 15B is a projection view illustrating an operation example of image display system 1D in FIG. 14A.

FIG. 15A is a top view illustrating a positional relationship among display 52, screen 60, and user 80 when the viewpoint of user 80 is shifted to the left in image display system 1D in FIG. 14A. FIG. 15B is a projection view illustrating an operation example of a dividing operation in image display system 1D in FIG. 14A. With reference to FIG. 15B, part (a) illustrates an image content input to projector 51, and part (b) illustrates an image content input to display 52.

In image display system 1D in FIG. 14A, when the position of the viewpoint is shifted to the left as illustrated in FIG. 15A, mask region 92 is also shifted to the left. Accordingly, as illustrated in FIG. 15B, based on the viewpoint position of user 80 detected by viewpoint sensor 90, the first image content is deformed such that the image to be displayed on display 52 is shifted to the left and mask region 92 of projector 51 is shifted to the left. This allows user 80 to observe the image in which first display image 71 and second display image 72 are continuous as illustrated in part (c) of FIG. 15B. Note that, instead of deforming the image to be displayed on display 52, it is also possible to improve the continuity of the two images by deforming the image to be displayed by projector 51 to be shifted to the left. Details of these dividing operations are omitted because the fourth exemplary embodiment can be referred to.

(Other Exemplary Embodiments)

The first to fifth exemplary embodiments each have been described above as an example of the technique disclosed in the present disclosure. However, the technique of the present disclosure is not limited to these exemplary embodiments, and also applicable to other exemplary embodiments that undergo modifications, replacements, additions, and omissions, for example, as appropriate. A new exemplary embodiment can also be made by combining the respective components described in the exemplary embodiments above. Accordingly, other exemplary embodiments will be exemplarily described below.

The first to fifth exemplary embodiments have exemplified two devices that are projector 51 and display 52 as the plurality of image display devices having different characteristics. However, the present disclosure is not limited to this, and a number of image display devices may be any number of two or more, or at least some of the image display devices may have the same device characteristics. For example, the image display system may include one display, one projector, and two spotlight projectors.

The image display system according to the present disclosure may include one display and two projectors. For example, in the image display system illustrated in FIGS. 2A and 10A, instead of projector 51 located at the center in the lateral direction, two projectors are arranged on the left and right, respectively, so that the region of the first display image that cannot be projected on screen 60 can be reduced by being hidden by display 52. In this case, the first display image can be divided into two and displayed on two projectors.

In addition, in each of the first to fifth exemplary embodiments, the image display system may include another display placed at the position of screen 60 instead of projector 51 and screen 60. In this case, first display image 71 may be displayed in mask region 92.

In each of the first to fifth exemplary embodiments, when first display image 71 and second display image 72 are superimposed and displayed in the mask region, first display image 71 may be displayed in the mask region.

Furthermore, each of the first to fifth exemplary embodiments has exemplified the case in which illuminance sensor 40 or camera sensor 40A is disposed at the upper portion on screen 60. However, the position of illuminance sensor 40 or camera sensor 40A is not limited to the position on screen 60, and illuminance sensor 40 or camera sensor 40A may be built in display 52, for example.

Further, the first and second exemplary embodiments each have exemplified the method for improving the continuity of the contrast and the chromaticity between a plurality of image display devices having different characteristics. However, instead of or in addition to contrast and chromaticity, luminance continuity may be improved. In this case, the device characteristic data in the device characteristic database includes an external light luminance characteristic indicating the influence of the luminance of external light on the luminance of a display image.

As described above, the exemplary embodiments have been described as examples of the technique of the present disclosure. In addition, for this purpose, the accompanying drawings and the detailed description have been provided.

Therefore, in order to illustrate the above techniques, the components described in the accompanying drawings and the detailed description can include not only components necessary to solve the problem but also components not necessary to solve the problem. Therefore, it should not be immediately construed that these components that are not essential are essential just because these components that are not essential are described in the accompanying drawings and the detailed description.

Since the above-described exemplary embodiments are intended to exemplify the technique according to the present disclosure, various modifications, replacements, additions, and omissions can be made within the scope of the appended claims or of their equivalents.

The present disclosure can be applied to an image display system including a plurality of image display devices having different device characteristics.

What is claimed is:

1. An image display system that causes a plurality of image display devices having different device characteristics to respectively display images, the image display system comprising:
    an external light detection device that detects external light; and
    an image adjustment device that performs adjustment to make at least one of contrast, chromaticity, and luminance continuous between the images displayed on the plurality of image display devices, the adjustment being performed based on the different device characteristics and the detected external light, wherein
    the plurality of image display devices include a first image display device and a second image display device,
    the first image display device displays an image having a contrast lower than a contrast of an image displayed on the second image display device when illuminance of the external light is higher than a predetermined value, and displays an image having a contrast higher than a contrast of the image displayed on the second image display device when illuminance of the external light is lower than the predetermined value, and
    the image adjustment device sets a contrast set value of one of the first image display device and the second image display device which displays an image having a higher contrast than another of the first image display device and the second image display device to a value lower than a predetermined contrast value.

2. The image display system according to claim 1, wherein the image adjustment device performs the adjustment by changing a set value related to the at least one of contrast, chromaticity, and luminance of the plurality of image display devices.

3. The image display system according to claim 1, wherein the image adjustment device performs the adjustment by converting the images displayed on the plurality of image display devices while changing the at least one of contrast, chromaticity, and luminance of the images.

4. The image display system according to claim 1, wherein the first image display device is a projection image display device and the second image display device is a light-emitting image display device.

5. The image display system according to claim 1, wherein the image adjustment device divides one input image and outputs a plurality of divided images to the plurality of image display devices.

6. An image display system that causes a plurality of image display devices to respectively display images, the image display system comprising:

an external light detection device that detects external light; and an image adjustment device that, in a case in which a predetermined original image is divided into a plurality of images and the plurality of divided images are respectively displayed on the plurality of image display devices, displays the plurality of divided images to form one continuous original image when viewed from a viewpoint position of a user, wherein the plurality of image display devices include a first image display device and a second image display device, the first image display device displays an image having a contrast lower than a contrast of an image displayed on the second image display device when illuminance of the external light is higher than a predetermined value, and displays an image having a contrast higher than a contrast of the image displayed on the second image display device when illuminance of the external light is lower than the predetermined value, and the image adjustment device sets a contrast set value of one of the first image display device and the second image display device which displays an image having a higher contrast than another of the first image display device and the second image display device to a value lower than a predetermined contrast value.

7. The image display system according to claim 6, wherein the viewpoint position of the user is a predetermined viewpoint position.

8. The image display system according to claim 6, further comprising a viewpoint sensor that detects the viewpoint position of the user, wherein the image adjustment device adjusts image signals of the plurality of images to display the one original image in which the plurality of divided images are continuous with each other when the user views from the viewpoint position based on the detected viewpoint position.

9. The image display system according to claim 6, wherein
the first image display device is a projection image display device.

10. The image display system according to claim 9, wherein the second image display device is a light-emitting image display device.

11. The image display system according to claim 9, wherein one of the first and second image display devices is located closer to the user than another is.

12. The image display system according to claim 9, wherein the first image display device has transparency.

13. An image display method of causing a plurality of image display devices having different device characteristics to respectively display images, the image display method comprising:

detecting external light; and performing adjustment to make at least one of contrast, chromaticity, and luminance continuous between the images displayed on the plurality of image display devices, the adjustment being performed based on the different device characteristics and the detected external light, wherein the plurality of image display devices include a first image display device and a second image display device, the first image display device displays an image having a contrast lower than a contrast of an image displayed on the second image display device when illuminance of the external light is higher than a predetermined value, and displays an image having a contrast higher than a contrast of the image displayed on the second image display device when illuminance of the external light is lower than the predetermined value, and said performing adjustment comprises setting a contrast set value of one of the first image display device and the second image display device which displays an image having a higher contrast than another of the first image display device and the second image display device to a value lower than a predetermined contrast value.

14. An image display method of causing a plurality of image display devices to respectively display images, the image display method comprising:

detecting external light;

dividing a predetermined original image into a plurality of images; and when respectively displaying the plurality of divided images on the plurality of image display devices, displaying the plurality of divided images to form one continuous original image when viewed from a viewpoint position of a user, wherein the plurality of image display devices include a first image display device and a second image display device, the first image display device displays an image having a contrast lower than a contrast of an image displayed on the second image display device when illuminance of the external light is higher than a predetermined value, and displays an image having a contrast higher than a contrast of the image displayed on the second image display device when illuminance of the external light is lower than the predetermined value, and when respectively displaying the plurality of divided images on the plurality of image display devices, a contrast set value of one of the first image display device and the second image display device which displays an image having a higher contrast than another of the first image display device and the second image display device is set to a value lower than a predetermined contrast value.

* * * * *